United States Patent
Imamura

(10) Patent No.: US 10,928,707 B2
(45) Date of Patent: Feb. 23, 2021

(54) CAMERA SYSTEM, INTERCHANGEABLE LENS, CAMERA, AND POWER SUPPLY METHOD OF CAMERA SYSTEM

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/447,476

(22) Filed: Jun. 20, 2019

(65) Prior Publication Data

US 2019/0302575 A1  Oct. 3, 2019

Related U.S. Application Data

(63) Continuation of application No. PCT/JP2017/047322, filed on Dec. 28, 2017.

(30) Foreign Application Priority Data

Jan. 27, 2017 (JP) .............................. JP2017-013513

(51) Int. Cl.
  *G03B 17/14* (2006.01)
  *G02B 7/09* (2006.01)
  (Continued)

(52) U.S. Cl.
  CPC .............. *G03B 17/14* (2013.01); *G02B 7/09* (2013.01); *G02B 7/14* (2013.01); *G02B 27/646* (2013.01);
  (Continued)

(58) Field of Classification Search
  CPC ... G02B 7/36; G02B 7/08; G02B 7/32; G02B 7/34; G03B 17/14
  (Continued)

(56) References Cited

U.S. PATENT DOCUMENTS 4,572,638 A * 2/1986 Nakai ....................... G03B 7/20
  348/E5.044
4,733,258 A * 3/1988 Kojima .................. G03B 17/14
  396/71
(Continued)

FOREIGN PATENT DOCUMENTS

CN   103365042 A   10/2013
CN   104054022 A   9/2014
(Continued)

OTHER PUBLICATIONS

International Preliminary Report on Patentability and Written Opinion of the International Searching Authority (Forms PCT/IPEA/409) for International Application No. PCT/JP2017/047322, dated Sep. 3, 2018, with English translation.

(Continued)

*Primary Examiner* — Clayton E. LaBalle
*Assistant Examiner* — Kevin C Butler
(74) *Attorney, Agent, or Firm* — Birch, Stewart, Kolasch & Birch, LLP

(57) ABSTRACT

Provided are a camera system, an interchangeable lens, a camera, and a power supply method of a camera system capable of simplifying a configuration. In a camera system (1) comprising a camera (10) and an interchangeable lens (100), a plurality of pieces of lens-drive power (VL1 to VL3) having different voltages are supplied from the camera (10) to the interchangeable lens (100). The interchangeable lens (100) drives a plurality of optical member drive units such as a focus drive unit and a stop drive unit using the plurality of supplied pieces of lens-drive power (VL1 to VL3). Further, system power for operating a lens microcomputer (114) is generated using the lens-drive power (VL1) having the lowest voltage among the plurality of supplied pieces of lens-drive power (VL1 to VL3).

25 Claims, 13 Drawing Sheets

(51) Int. Cl.
    *G02B 7/14*     (2006.01)
    *G02B 27/64*     (2006.01)
    *G03B 7/26*     (2006.01)
    *G03B 17/02*     (2006.01)
    *H04N 5/225*     (2006.01)
    *G03B 17/56*     (2006.01)

(52) U.S. Cl.
    CPC ............... *G03B 7/26* (2013.01); *G03B 17/02* (2013.01); *G03B 17/56* (2013.01); *H04N 5/225* (2013.01); *G03B 2217/007* (2013.01)

(58) Field of Classification Search
    USPC .......................................................... 396/93
    See application file for complete search history.

(56) References Cited

U.S. PATENT DOCUMENTS

| | | | | |
|---|---|---|---|---|
| 4,758,854 A * | 7/1988 | Saegusa | ................. | G03B 17/14 396/529 |
| 4,963,910 A * | 10/1990 | Ishimura | ................. | G02B 7/28 396/125 |
| 5,214,464 A * | 5/1993 | Karasaki | ................. | G02B 7/346 396/121 |
| 5,748,999 A * | 5/1998 | Ueda | ....................... | G03B 17/14 396/91 |
| 5,765,055 A * | 6/1998 | Miyazawa | ............. | G03B 17/14 396/137 |
| 5,809,354 A * | 9/1998 | Miyazawa | ............. | G03B 17/14 396/301 |
| 5,822,632 A * | 10/1998 | Miyazawa | ............. | G03B 17/14 396/529 |
| 6,704,053 B1 * | 3/2004 | Niikawa | ............... | H04N 5/2254 348/335 |
| 6,707,992 B2 * | 3/2004 | Uenaka | ................ | G02B 27/646 396/529 |
| 6,734,912 B1 * | 5/2004 | Kanayama | ......... | H04N 5/23209 348/222.1 |
| 7,467,900 B2 * | 12/2008 | Higuma | ................... | G03B 7/20 348/E5.044 |
| 2006/0165401 A1 * | 7/2006 | Doi | ........................ | G03B 17/56 396/71 |
| 2009/0154915 A1 * | 6/2009 | Hasuda | .................. | G03B 17/02 396/535 |
| 2010/0195987 A1 | 8/2010 | Desorbo | | |
| 2011/0299847 A1 * | 12/2011 | Sakamoto | .............. | G03B 17/14 396/529 |
| 2012/0033955 A1 * | 2/2012 | Okada | .................. | G03B 17/565 396/71 |
| 2012/0044407 A1 * | 2/2012 | Murashima | ............ | G03B 13/36 348/345 |
| 2012/0163786 A1 * | 6/2012 | Murashima | ............ | G03B 13/36 396/91 |
| 2013/0265657 A1 | 10/2013 | Hasegawa et al. | | |
| 2014/0327814 A1 | 11/2014 | Imamura | | |
| 2015/0070521 A1 * | 3/2015 | Yasuda | ................ | G03B 17/565 348/211.1 |
| 2015/0116592 A1 | 4/2015 | Suzuki | | |
| 2019/0302575 A1 | 10/2019 | Imamura | | |

FOREIGN PATENT DOCUMENTS

| | | | | |
|---|---|---|---|---|
| JP | 11346435 | * | 6/1998 | ............... H02J 1/00 |
| JP | 11-346435 A | | 12/1999 | |
| JP | 2004-117380 A | | 4/2004 | |
| JP | 2009-93122 A | | 4/2009 | |
| JP | 2009-145532 A | | 7/2009 | |
| JP | 2013-171077 A | | 9/2013 | |
| JP | 2013-172195 A | | 9/2013 | |
| JP | 2013172195 | * | 9/2013 | ............ G03B 17/14 |
| JP | 2014-134807 A | | 7/2014 | |
| JP | 5729067 B2 | | 6/2015 | |
| JP | 2016-95530 A | | 5/2016 | |
| JP | 6577154 B2 | | 9/2019 | |
| WO | WO 2009/048074 A1 | | 4/2009 | |

OTHER PUBLICATIONS

International Search Report and Written Opinion of the International Searching Authority (Forms PCT/ISA/210 and PCT/ISA/237) for International Application No. PCT/JP2017/047322, dated Mar. 27, 2018, with an English translation of the International Search Report.
Japanese Office Action dated Sep. 2, 2020 for Application No. 2019-151082 with an English translation.
Office Action dated May 19, 2020 in counterpart German Patent Application No. 11 2017 006 941.6, with English translation.
Chinese Office Action and Search Report, dated Nov. 17, 2020, in the counterpart Chinese Patent Application No. 201780064793.1, with an English translation.

* cited by examiner

CAMERA SYSTEM, INTERCHANGEABLE LENS, CAMERA, AND POWER SUPPLY METHOD OF CAMERA SYSTEM

CROSS-REFERENCE TO RELATED APPLICATIONS

The present application is a Continuation of PCT International Application No. PCT/JP2017/047322 filed on Dec. 28, 2017 claiming priority under 35 U.S.C § 119(a) to Japanese Patent Application No. 2017-013513 filed on Jan. 27, 2017. Each of the above applications is hereby expressly incorporated by reference, in their entirety, into the present application.

BACKGROUND OF THE INVENTION

1. Field of the Invention

The present invention relates to a lens-interchangeable camera system, an interchangeable lens of a lens-interchangeable camera system, a camera of a lens-interchangeable camera system, and a power supply method of a lens-interchangeable camera system.

2. Description of the Related Art

In a lens-interchangeable camera system, power is supplied from a camera to an interchangeable lens to operate an actuator, a microcomputer, and the like built in the interchangeable lens.

However, a power voltage required for an individual interchangeable lens is different depending on a type of the actuator, the number of the actuators, and the like built in the individual interchangeable lens.

JP2004-117380A suggests that a camera is provided with a plurality of power supply units so as to be able to selectively supply a plurality of types of power having different voltages to an interchangeable lens in a lens-interchangeable camera system.

SUMMARY OF THE INVENTION

However, since the camera system of JP2004-117380A can supply only one type of power selected for the interchangeable lens, there is a disadvantage that power is required to be generated in the interchangeable lens for each actuator in a case where a plurality of actuators having different operation voltages are built in the interchangeable lens. As a result, there is a disadvantage that a configuration of the interchangeable lens is complicated. In particular, in a case where noise is generated at the time of the power generation, a countermeasure is required to be taken. Consequently, there is a disadvantage that the configuration thereof becomes more complicated.

Further, since power for the actuator and power for the microcomputer are supplied by separate systems in the camera system of JP2004-117380A, there is a disadvantage that a power contact for the microcomputer is required to be provided separately from a power contact for the actuator.

The invention is made in consideration of such circumstances, and an object of the invention is to provide a camera system, an interchangeable lens, a camera, and a power supply method of a camera system capable of simplifying a configuration.

Means for solving the above problem is as follows.

(1) A lens-interchangeable camera system comprises a camera and an interchangeable lens to be attachably and detachably attached to the camera. The camera comprises a camera-side mount, a camera-side contact group that is composed of a plurality of contacts including a plurality of power contacts, ground contacts, and communication contacts, and is provided in the camera-side mount, a power supply unit that supplies pieces of lens-drive power respectively having different voltages to the plurality of power contacts of the camera-side contact group, and a camera control unit, and the interchangeable lens comprises a lens-side mount to be attachably and detachably attached to the camera-side mount, a lens-side contact group provided in the lens-side mount to correspond to the camera-side contact group, at least one optical member drive unit that drives at least one optical member constituting the interchangeable lens by a plurality of pieces of lens-drive power to be input from the plurality of power contacts of the lens-side contact group, a lens control unit that is operated at a voltage lower than that of the optical member drive unit, and a lens-side system power generation unit that generates system power to be supplied to the lens control unit by using lens-drive power having the lowest voltage among the plurality of pieces of lens-drive power to be input from the plurality of power contacts of the lens-side contact group.

According to this aspect, in a case where the interchangeable lens is attached to the camera, the lens-side contact group provided in the lens-side mount of the interchangeable lens is connected to the camera-side contact group provided in the camera-side mount of the camera. The lens-side contact group corresponds to the camera-side contact group and is composed of the plurality of contacts including the plurality of power contacts, ground contacts, and communication contacts. In the case where the lens-side contact group is connected to the camera-side contact group, the corresponding contacts are connected. That is, the power contacts, the ground contacts, and the communication contacts are connected. Since the plurality of power contacts are provided, the corresponding power contacts are connected.

The pieces of lens-drive power having different voltages are respectively supplied to the plurality of power contacts of the camera-side contact group provided in the camera-side mount of the camera. Accordingly, it is possible to supply the plurality of pieces of lens-drive power having different voltages to the interchangeable lens. Further, accordingly, even in a case where the interchangeable lens is provided with a plurality of optical member drive units having different operation voltages, the plurality of pieces of lens-drive power having different voltages can be used as the power of each optical member drive unit as it is. That is, each optical member drive unit can be used without generating the power for the drive thereof in the interchangeable lens. Accordingly, it is possible to simplify the configuration of the interchangeable lens. Furthermore, since the multi-contact configuration can reduce touch resistance, it is possible to efficiently supply the power.

Further, according to this aspect, the system power which is the power for the lens control unit is generated from the lens-drive power. Accordingly, it is possible to omit installation of the power contact for the lens control unit. Further, in the case where the system power is generated, it is possible to efficiently generate the system power by using the lens-drive power having the lowest voltage.

(2) In the camera system according to (1) described above, the lens-side system power generation unit generates system power by a voltage drop caused by a resistor.

According to this aspect, the system power is generated by the voltage drop caused by the resistor. Accordingly, it is possible to prevent the generation of the noise accompanied by the generation of the system power. An example of this type of the lens-side system power generation unit is a low dropout (LDO) regulator. The LDO regulator is one of linear regulators and converts an input voltage into a desired output voltage by consuming input power using on-resistance of a switching element such as a power metal-oxide semiconductor field effect transistor (MOSFET) or a power transistor.

(3) In the camera system according to (1) or (2) described above, the lens-side mount is rotated to be attached to the camera-side mount. In the camera-side contact group and the lens-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

According to this aspect, the lens-side mount is rotated to be attached to the camera-side mount. In the camera-side contact group provided in the camera-side mount and the lens-side contact group provided in the lens-side mount, the plurality of power contacts and ground contacts are disposed adjacent to each other and the ground contacts are disposed on the front side of the plurality of power contacts with respect to the rotation direction in the case where the lens-side mount is attached to the camera-side mount. Further, the power contacts are disposed in the ascending order of the voltage from the front side with respect to the rotation direction in the case where the lens-side mount is attached to the camera-side mount. Accordingly, in a case where the interchangeable lens is detached from the camera, it is possible to appropriately process a charge remaining on an interchangeable lens side. That is, in a case where the lens-side mount is rotated to detach the interchangeable lens from the camera, a power contact to which lens-drive power having the highest voltage among the plurality of power contacts of the lens-side contact group is input is connected to the ground contact of the camera-side contact group. Further, a power contact to which lens-drive power having the second highest voltage among the plurality of power contacts of the lens-side contact group is input is connected to a power contact outputting lens-drive power having the highest voltage among the plurality of power contacts of the camera-side contact group. In this manner, in the case where the interchangeable lens is detached from the camera, each power contact on the interchangeable lens side is connected to the power contact on the camera side outputting the lens-drive power having higher voltage or the ground contact. Therefore, it is possible to prevent the charge remaining in the interchangeable lens from flowing into the power contact on the camera-side outputting the lens-drive power having lower voltage or the like and thus to appropriately prevent the charge remaining in the interchangeable lens from destructing a circuit or the like on the camera-side.

(4) In the camera system according to any one of (1) to (3) described above, the lens-side mount is rotated to be attached to the camera-side mount. The camera-side contact group and the lens-side contact group further respectively include a lens detection contact. The lens detection contact is disposed at a head in a rotation direction in the case where the lens-side mount is attached to the camera-side mount.

According to this aspect, the lens-side mount is rotated to be attached to the camera-side mount. Further, the contacts constituting the camera-side contact group and the lens-side contact group include the lens detection contact. The lens detection contact is disposed at the head in the rotation direction in the case where the lens-side mount is attached to the camera-side mount. Accordingly, in the case where the interchangeable lens is attached and detached, it is possible to prevent a contact other than the lens detection contact of the lens-side contact group from touching the lens detection contact of the camera-side contact group. Accordingly, it is possible to prevent erroneous detection.

(5) In the camera system according to (4) described above, the camera-side contact group and the lens-side contact group are disposed in an order of the lens detection contact as the head and other contacts including the plurality of power contacts, ground contacts, and communication contacts with respect to the rotation direction in the case where the lens-side mount is attached to the camera-side mount.

According to this aspect, each contact constituting the camera-side contact group and the lens-side contact group is disposed in the order of the lens detection contact as the head and other contacts including the plurality of power contacts, ground contacts, and communication contacts with respect to the rotation direction in the case where the lens-side mount is attached to the camera-side mount. Accordingly, it is possible to improve a self-cleaning effect of the plurality of power contacts of the lens-side contact group. Further, accordingly, it is possible to reduce the touch resistance of the power contact and thus to efficiently supply the power.

(6) In the camera system according to any one of (1) to (5) described above, the camera further comprises a lens-drive power switch unit that individually turns on and off supplying of lens-drive power to be supplied to the plurality of power contacts of the camera-side contact group from the power supply unit. In a case where the interchangeable lens is attached, the camera control unit communicates with the lens control unit to acquire lens information on the interchangeable lens attached to the camera from the lens control unit, discriminates lens-drive power required for the interchangeable lens attached to the camera based on the acquired lens information, and controls the lens-drive power switch unit based on a discriminated result to supply only the lens-drive power required for the interchangeable lens.

According to this aspect, the lens-drive power switch unit that individually turns on and off supplying of the lens-drive power is further provided. In the case where the interchangeable lens is attached, the camera control unit provided in the camera communicates with the lens control unit provided in the interchangeable lens to acquire the lens information on the interchangeable lens attached to the camera. The communication is performed through the communication contact. The camera control unit discriminates the lens-drive power required for the interchangeable lens attached to the camera based on the acquired lens information. The lens-drive power switch unit is controlled based on the discriminated result to supply only the lens-drive power required for the interchangeable lens. Accordingly, it is possible to efficiently supply the power.

(7) In the camera system according to any one of (1) to (6) described above, the power supply unit has a supplying capacity enhancement function for enhancing supplying capacity of lens-drive power having the highest voltage among the plurality of pieces of lens-drive power. In the case where the interchangeable lens is attached, the camera control unit communicates with the lens control unit to acquire the lens information on the interchangeable lens attached to the camera from the lens control unit, discriminates whether lens-drive power with enhanced supplying capacity is necessary based on the acquired lens information, and operates the supplying capacity enhancement function of the power supply unit in a case where it is discriminated that the lens-drive power with enhanced supplying capacity is necessary.

According to this aspect, the function (supplying capacity enhancement function) for enhancing the supplying capacity of the lens-drive power having the highest voltage among the plurality of pieces of lens-drive power is provided in the power supply unit. In the case where the interchangeable lens is attached, the camera control unit communicates with the lens control unit to acquire the lens information on the interchangeable lens attached to the camera from the lens control unit and discriminates whether the lens-drive power with enhanced supplying capacity is necessary based on the acquired lens information. In the case where it is discriminated that the lens-drive power with enhanced supplying capacity is necessary, the supplying capacity enhancement function of the power supply unit is operated. Accordingly, it is possible to appropriately supply the power required for the interchangeable lens.

(8) In the camera system according to (7) described above, the supplying capacity enhancement function is a function of increasing a voltage of the lens-drive power having the highest voltage among the plurality of pieces of lens-drive power or a function of increasing a current amount of the lens-drive power having the highest voltage among the plurality of pieces of lens-drive power.

According to this aspect, the supplying capacity enhancement function is composed of the function of increasing a voltage of the lens-drive power having the highest voltage among the plurality of pieces of lens-drive power or the function of increasing a current amount of the lens-drive power having the highest voltage among the plurality of pieces of lens-drive power.

(9) In the camera system according to any one of (1) to (8) described above, a pull-up resistor that pulls a contact up to potential of the system power generated by the lens-side system power generation unit is connected to at least one contact excluding the power contact and the ground contact among the plurality of contacts constituting the lens-side contact group. The camera control unit discriminates a polarity of a contact of the camera-side contact group to be connected to the contact of the lens-side contact group to which the pull-up resistor is connected to discriminate presence or absence of supplying of the system power to the lens control unit.

According to this aspect, the pull-up resistor that pulls the contact up to the potential of the system power generated by the lens-side system power generation unit is connected to at least one contact excluding the power contact and the ground contact among the plurality of contacts constituting the lens-side contact group. The camera control unit discriminates the polarity of the contact of the camera-side contact group to be connected to the contact of the lens-side contact group to which the pull-up resistor is connected to discriminate the presence or absence of the supplying of the system power to the lens control unit. Accordingly, it is possible to appropriately detect the supplying of the system power to the lens control unit on the camera side.

(10) In the camera system according to (9) described above, a pull-down resistor that pulls a contact down to potential of the ground is connected to at least one contact excluding the power contact, the ground contact, and the contact of the lens-side contact group to which the pull-up resistor is connected among the plurality of contacts constituting the lens-side contact group. The camera control unit discriminates the polarity of the contact of the camera-side contact group to be connected to the contact of the lens-side contact group to which the pull-up resistor is connected and a polarity of a contact of the camera-side contact group to be connected to the contact of the lens-side contact group to which the pull-down resistor is connected to discriminate whether a regular interchangeable lens is attached.

According to this aspect, the pull-down resistor that pulls the contact down to the potential of the ground is connected to at least one contact excluding the power contact, the ground contact, and the contact of the lens-side contact group to which the pull-up resistor is connected among the plurality of contacts constituting the lens-side contact group. The camera control unit discriminates the polarity of the contact of the camera-side contact group to be connected to the contact of the lens-side contact group to which the pull-up resistor is connected and the polarity of the contact of the camera-side contact group to be connected to the contact of the lens-side contact group to which the pull-down resistor is connected to discriminate whether the regular interchangeable lens is attached. Accordingly, it is possible to simply discriminate whether the regular interchangeable lens is attached on the camera side.

(11) In the camera system according to any one of (1) to (10) described above, the camera-side contact group and the lens-side contact group comprise a plurality of ground contacts.

According to this aspect, the camera-side contact group and the lens-side contact group comprise the plurality of ground contacts. Accordingly, it is possible to reduce the touch resistance and thus to efficiently supply the power.

(12) The camera system according to any one of (1) to (11) described above further comprises an accessory to be attachably and detachably attached between the camera and the interchangeable lens. The accessory comprises an accessory-side first mount to be attachably and detachably attached to the camera-side mount, an accessory-side second mount to be attachably and detachably attached to the lens-side mount, an accessory-side first contact group provided in the accessory-side first mount to correspond to the camera-side contact group, an accessory-side second contact group provided in the accessory-side second mount to correspond to the lens-side contact group, a plurality of accessory-side power lines that connect the plurality of power contacts of the accessory-side first contact group and the plurality of power contacts of the accessory-side second contact group, a plurality of accessory-side ground lines that connect a ground contact of the accessory-side first contact group and a ground contact of the accessory-side second contact group, a plurality of accessory-side communication lines that connect a communication contact of the accessory-side first contact group and a communication contact of the accessory-side second contact group, an accessory control unit that is operated at a voltage lower than that of the optical member drive unit, and an accessory-side system power generation unit that generates system power to be supplied to the accessory control unit using lens-drive power having the lowest voltage among the plurality of pieces of lens-drive power to be supplied through the plurality of accessory-side power lines.

According to this aspect, the accessory is further provided. The accessory is attachably and detachably attached between the camera and the interchangeable lens. In the case where the accessory is attached, the accessory-side first contact group provided in the accessory-side first mount of the accessory is connected to the camera-side contact group provided in the camera-side mount of the camera. Further, the accessory-side second contact group provided in the accessory-side second mount of the accessory is connected to the lens-side contact group provided in the lens-side mount of the interchangeable lens. The accessory-side first contact group corresponds to the camera-side contact group and is composed of the plurality of contacts including the plurality of power contacts, ground contacts, and communication contacts. Further, the accessory-side second contact group corresponds to the lens-side contact group and is composed of the plurality of contacts including the plurality of power contacts, ground contacts, and communication contacts. In the case where the accessory-side first contact group is connected to the camera-side contact group, the corresponding contacts are connected. Further, in the case where the accessory-side second contact group is connected to the lens-side contact group, the corresponding contacts are connected.

The accessory is provided with the accessory control unit, and the system power for the accessory control unit is generated from the lens-drive power. Accordingly, it is possible to omit installation of the power contact for the accessory control unit. Further, in the case where the system power is generated, it is possible to efficiently generate the system power by using the lens-drive power having the lowest voltage.

(13) An interchangeable lens to be attachably and detachably attached to a camera comprising a camera-side mount, a camera-side contact group that is composed of a plurality of contacts including a plurality of power contacts, ground contacts, and communication contacts, and is provided in the camera-side mount, and a power supply unit that supplies pieces of lens-drive power respectively having different voltages to the plurality of power contacts of the camera-side contact group comprises a lens-side mount to be attachably and detachably attached to the camera-side mount, a lens-side contact group provided in the lens-side mount to correspond to the camera-side contact group, at least one optical member drive unit that drives at least one optical member constituting the interchangeable lens by a plurality of pieces of lens-drive power to be input from the plurality of power contacts of the lens-side contact group, a lens control unit that is operated at a voltage lower than that of the optical member drive unit, and a lens-side system power generation unit that generates system power to be supplied to the lens control unit by using lens-drive power having the lowest voltage among the plurality of pieces of lens-drive power to be input from the plurality of power contacts of the lens-side contact group.

According to this aspect, the lens-side contact group provided in the lens-side mount includes the plurality of power contacts. Accordingly, it is possible to supply the plurality of pieces of lens-drive power having different voltages from the camera side. Further, accordingly, even in a case where the interchangeable lens is provided with a plurality of optical member drive units having different operation voltages, the plurality of pieces of lens-drive power having different voltages can be used as the power of each optical member drive unit as it is. That is, each optical member drive unit can be used without generating the power for the drive thereof in the interchangeable lens. Further, according to this aspect, the system power which is the power for the lens control unit is generated from the lens-drive power. Accordingly, it is possible to omit installation of the power contact for the lens control unit. Further, in the case where the system power is generated, it is possible to efficiently generate the system power by using the lens-drive power having the lowest voltage.

(14) In the interchangeable lens according to (13) described above, the lens-side system power generation unit generates system power by a voltage drop caused by a resistor.

According to this aspect, the system power is generated by the voltage drop caused by the resistor. Accordingly, it is possible to prevent the generation of the noise accompanied by the generation of the system power.

(15) In the interchangeable lens according to (13) or (14) described above, the lens-side mount is rotated to be attached to the camera-side mount. In the lens-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

According to this aspect, the lens-side mount is rotated to be attached to the camera-side mount. In the camera-side contact group provided in the camera-side mount and the lens-side contact group provided in the lens-side mount, the plurality of power contacts and ground contacts are disposed adjacent to each other and the ground contacts are disposed on the front side of the plurality of power contacts with respect to the rotation direction in the case where the lens-side mount is attached to the camera-side mount. Further, the power contacts are disposed in the ascending order of the voltage from the front side with respect to the rotation direction in the case where the lens-side mount is attached to the camera-side mount. Accordingly, in a case where the interchangeable lens is detached from the camera, it is possible to appropriately process a charge remaining on an interchangeable lens side.

(16) In the interchangeable lens according to any one of (13) to (15) described above, the lens-side mount is rotated to be attached to the camera-side mount. The lens-side contact group further includes a lens detection contact. The lens detection contact is disposed at a head in a rotation direction in the case where the lens-side mount is attached to the camera-side mount.

According to this aspect, the lens-side mount is rotated to be attached to the camera-side mount. Further, the contacts constituting the lens-side contact group include the lens detection contact. The lens detection contact is disposed at the head in the rotation direction in the case where the lens-side mount is attached to the camera-side mount. Accordingly, in the case where the interchangeable lens is attached and detached, it is possible to prevent a contact other than the lens detection contact of the lens-side contact group from touching the lens detection contact of the camera-side contact group. Accordingly, it is possible to prevent erroneous detection.

(17) In the interchangeable lens according to (16) described above, the lens-side contact group is disposed in an order of the lens detection contact as the head and other contacts including the plurality of power contacts, ground contacts, and communication contacts with respect to the rotation direction in the case where the lens-side mount is attached to the camera-side mount.

According to this aspect, each contact constituting the lens-side contact group is disposed in the order of the lens detection contact as the head and other contacts including the plurality of power contacts, ground contacts, and communication contacts with respect to the rotation direction in the case where the lens-side mount is attached to the camera-side mount. Accordingly, it is possible to improve the self-cleaning effect of the plurality of power contacts of the lens-side contact group. Further, accordingly, it is possible to reduce the touch resistance of the power contact and thus to efficiently supply the power.

(18) A camera to which an interchangeable lens is attachably and detachably attached comprises a camera-side mount to which a lens-side mount provided in the interchangeable lens is attachably and detachably attached, a camera-side contact group that is composed of a plurality of contacts including a plurality of power contacts, ground contacts, and communication contacts, and is provided in the camera-side mount, a power supply unit that supplies pieces of lens-drive power respectively having different voltages to the plurality of power contacts of the camera-side contact group, in which a voltage of lens-drive power having the lowest voltage among a plurality of pieces of lens-drive power is higher than a voltage of system power of the interchangeable lens, and a camera control unit.

According to this aspect, the camera-side contact group provided in the camera-side mount includes the plurality of power contacts, and the pieces of lens-drive power having different voltages are supplied to respective power contacts. Accordingly, it is possible to supply the plurality of pieces of lens-drive power having different voltages to the interchangeable lens. Further, accordingly, even in a case where the interchangeable lens is provided with a plurality of optical member drive units having different operation voltages, the plurality of pieces of lens-drive power having different voltages can be used as the power of each optical member drive unit as it is.

(19) In the camera according to (18) described above, the lens-side mount is rotated to be attached to the camera-side mount. In the camera-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

(20) In the camera according to (18) or (19) described above, the lens-side mount is rotated to be attached to the camera-side mount. The camera-side contact group further includes a lens detection contact. The lens detection contact is disposed at a head in a rotation direction in the case where the lens-side mount is attached to the camera-side mount.

According to this aspect, the lens-side mount is rotated to be attached to the camera-side mount. Further, the contacts constituting the camera-side contact group includes the lens detection contact. The lens detection contact is disposed at the head in the rotation direction in the case where the lens-side mount is attached to the camera-side mount. Accordingly, in the case where the interchangeable lens is attached and detached, it is possible to prevent a contact other than the lens detection contact of the lens-side contact group from touching the lens detection contact of the camera-side contact group. Accordingly, it is possible to prevent erroneous detection.

(21) In the camera according to (20) described above, the camera-side contact group is disposed in an order of the lens detection contact as the head and other contacts including the plurality of power contacts, ground contacts, and communication contacts with respect to the rotation direction in the case where the lens-side mount is attached to the camera-side mount.

According to this aspect, each contact constituting the camera-side contact group is disposed in the order of the lens detection contact as the head and other contacts including the plurality of power contacts, ground contacts, and communication contacts with respect to the rotation direction in the case where the lens-side mount is attached to the camera-side mount. Accordingly, it is possible to improve a self-cleaning effect of the plurality of power contacts of the lens-side contact group. Further, accordingly, it is possible to reduce the touch resistance of the power contact and thus to efficiently supply the power.

(22) The camera according to any one of (18) to (21) described above further comprises a lens-drive power switch unit that individually turns on and off supplying of lens-drive power to be supplied to the plurality of power contacts of the camera-side contact group from the power supply unit. In a case where the interchangeable lens is attached, the camera control unit communicates with the lens control unit provided in the interchangeable lens to acquire lens information on the interchangeable lens attached to the camera from the lens control unit, discriminates lens-drive power required for the interchangeable lens attached to the camera based on the acquired lens information, and controls the lens-drive power switch unit based on a discriminated result to supply only the lens-drive power required for the interchangeable lens.

According to this aspect, in the case where the interchangeable lens is attached, the camera control unit provided in the camera communicates with the lens control unit provided in the interchangeable lens to acquire the lens information on the interchangeable lens attached to the camera. The communication is performed through the communication contact. The camera control unit discriminates the lens-drive power required for the interchangeable lens attached to the camera based on the acquired lens information. The lens-drive power switch unit is controlled based on the discriminated result to supply only the lens-drive power required for the interchangeable lens. Accordingly, it is possible to efficiently supply the power.

(23) In the camera according to any one of (18) to (22) described above, the power supply unit has a supplying capacity enhancement function for enhancing supplying capacity of lens-drive power having the highest voltage among the plurality of pieces of lens-drive power. In the case where the interchangeable lens is attached, the camera control unit communicates with the lens control unit provided in the interchangeable lens to acquire the lens information on the interchangeable lens attached to the camera from the lens control unit, discriminates whether lens-drive power with enhanced supplying capacity is necessary based on the acquired lens information, and operates the supplying capacity enhancement function of the power supply unit in a case where it is discriminated that the lens-drive power with enhanced supplying capacity is necessary.

According to this aspect, the function (supplying capacity enhancement function) for enhancing the supplying capacity of the lens-drive power having the highest voltage among the plurality of pieces of lens-drive power is provided in the power supply unit. In the case where the interchangeable lens is attached, the camera control unit communicates with the lens control unit to acquire the lens information on the interchangeable lens attached to the camera from the lens control unit and discriminates whether the lens-drive power with enhanced supplying capacity is necessary based on the acquired lens information. In the case where it is discriminated that the lens-drive power with enhanced supplying capacity is necessary, the supplying capacity enhancement function of the power supply unit is operated. Accordingly, it is possible to appropriately supply the power required for the interchangeable lens.

(24) In the camera according to (23) described above, the supplying capacity enhancement function is a function of increasing a voltage of the lens-drive power having the highest voltage among the plurality of pieces of lens-drive power or a function of increasing a current amount of the lens-drive power having the highest voltage among the plurality of pieces of lens-drive power.

According to this aspect, the supplying capacity enhancement function is composed of the function of increasing a voltage of the lens-drive power having the highest voltage among the plurality of pieces of lens-drive power or the function of increasing a current amount of the lens-drive power having the highest voltage among the plurality of pieces of lens-drive power.

(25) A power supply method that supplies lens-drive power and system power to an interchangeable lens in a lens-interchangeable camera system comprises a camera and the interchangeable lens to be attachably and detachably attached to the camera. The power supply method of a camera system comprises a step of connecting a plurality of power contacts provided in a camera-side mount of the camera and a plurality of power contacts provided in a lens-side mount of the interchangeable lens, a step of supplying a plurality of pieces of lens-drive power having different voltages from the camera to the interchangeable lens through a plurality of power contacts, and a step of generating system power using lens-drive power having the lowest voltage among the plurality of pieces of lens-drive power to be supplied from the camera.

According to this aspect, the plurality of pieces of lens-drive power having different voltages are supplied from the camera to the interchangeable lens through the plurality of power contacts. The system power is generated by using the lens-drive power having the lowest voltage among the plurality of supplied pieces of lens-drive power.

(26) The power supply method of a camera system according to (25) described above further comprises a step of acquiring lens information on the interchangeable lens attached to the camera, and a step of discriminating lens-drive power required for the interchangeable lens attached to the camera based on the acquired lens information to supply only the lens-drive power required for the interchangeable lens from the camera.

According to this aspect, the lens information is acquired from the interchangeable lens. The required lens-drive power is discriminated based on the acquired lens information to supply only the required lens-drive power from the camera.

(27) The power supply method of a camera system according to (25) or (26) described above further comprises a step of acquiring lens information on the interchangeable lens attached to the camera, a step of discriminating whether lens-drive power with enhanced supplying capacity is necessary based on the acquired lens information, and a step of enhancing the supplying capacity of lens-drive power having the highest voltage among the plurality of pieces of lens-drive power in a case where it is discriminated that the lens-drive power with enhanced supplying capacity is necessary.

According to this aspect, the lens information is acquired from the interchangeable lens. It is discriminated whether the lens-drive power with enhanced supplying capacity is necessary based on the acquired lens information. In the case where it is discriminated that the lens-drive power with enhanced supplying capacity is necessary, the supplying capacity of the lens-drive power having the highest voltage among the plurality of pieces of lens-drive power is enhanced and the enhanced lens-drive power is supplied to the interchangeable lens.

According to the invention, it is possible to simplify the configuration.

DESCRIPTION OF THE PREFERRED EMBODIMENTS

Hereinafter, preferable embodiments for implementing the invention will be described with reference to accompanying drawings.

First Embodiment

[Configuration of Camera System]

A lens-interchangeable camera system is configured to comprise at least one camera and at least one interchangeable lens.

Figure 1:
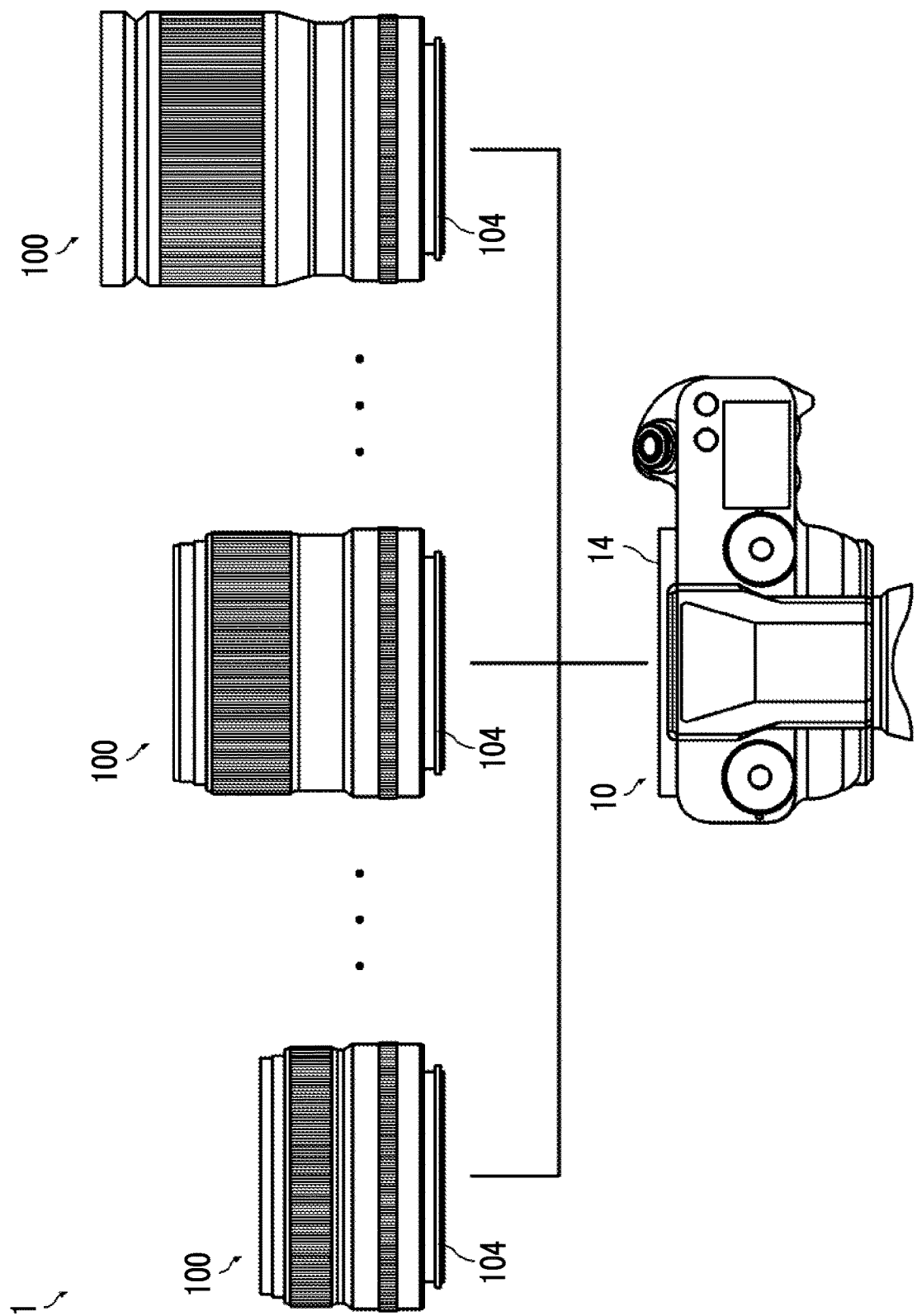
FIG. 1 is a system configuration diagram showing an example of a lens-interchangeable camera system.

FIG. 1 is a system configuration diagram showing an example of the lens-interchangeable camera system.

A camera system 1 shown in FIG. 1 is composed of one camera 10 and a plurality of interchangeable lenses 100.

The camera 10 is composed of a digital camera. In particular, the camera 10 of the embodiment is composed of a non-reflex digital camera. The non-reflex digital camera refers to a digital camera having no reflex mirror for guiding incident light from a lens to an optical finder. The non-reflex digital camera is also referred to as a mirrorless digital camera.

Each of the plurality of interchangeable lenses 100 comprises a common lens-side mount 104. Each interchangeable lens 100 has a different focal length.

<<Camera>>

Figure 2:
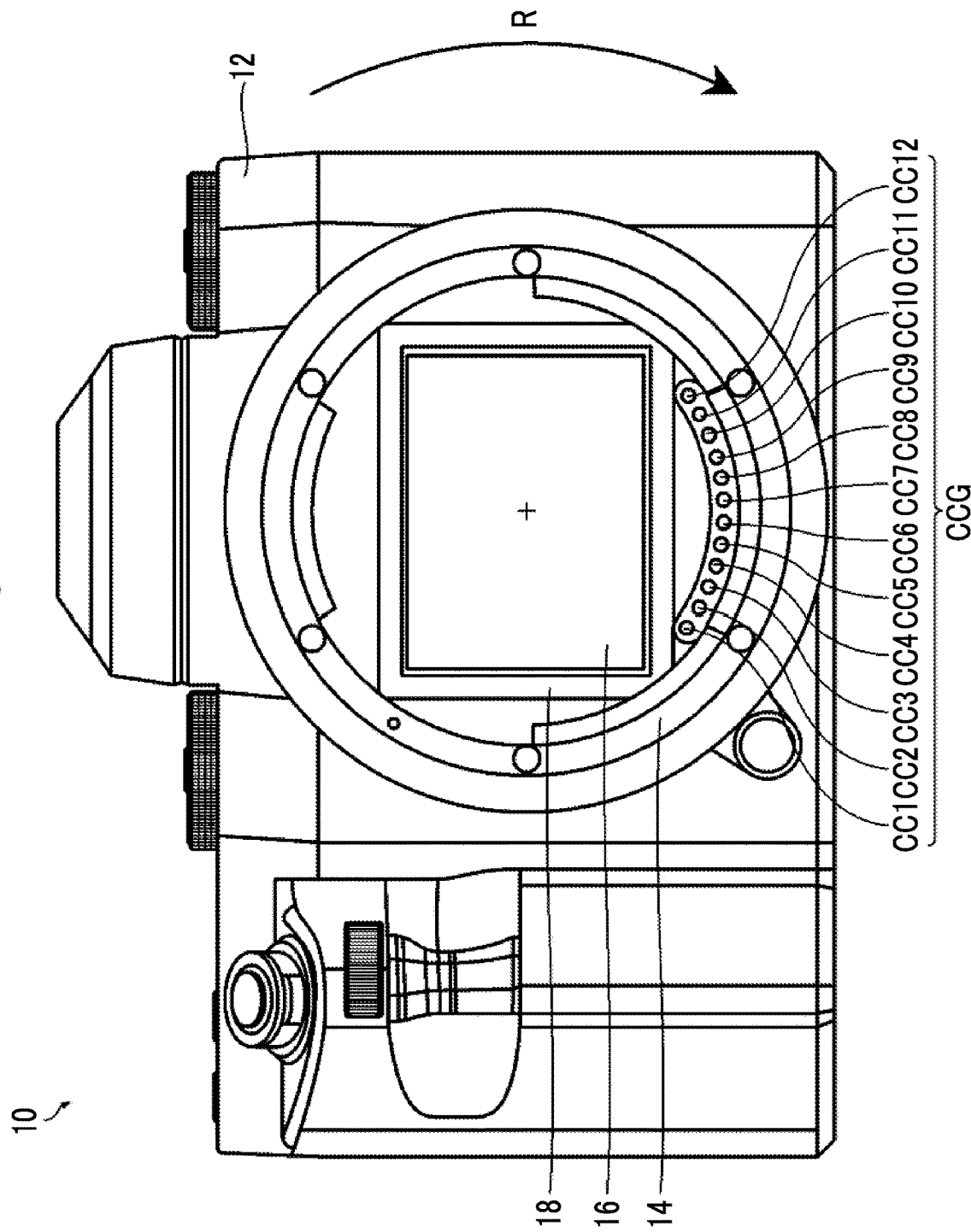
FIG. 2 is a front view of a camera.

FIG. 2 is a front view of a camera.

The camera 10 comprises the camera-side mount 14 on a front portion of a camera body 12 of the camera. The camera-side mount 14 is an attachment part of the interchangeable lens 100. The camera-side mount 14 is composed of a known bayonet mount. In FIG. 2, a direction indicated by an arrow R (clockwise direction) is a rotation direction of the interchangeable lens 100 in a case where the interchangeable lens 100 is attached to the camera 10.

The camera-side mount 14 is provided with a camera-side contact group CCG composed of a plurality of contacts CC1 to CC12. The plurality of contacts CC1 to CC12 constituting the camera-side contact group CCG are disposed at a constant interval on the circumference of one circle with an imaging optical axis as the center. A function of each of the contacts CC1 to CC12 will be described below.

In FIG. 2, reference numeral 16 is an image sensor, and reference numeral 18 is a shutter. The shutter 18 is composed of a square focal plane shutter and is disposed right before the image sensor 16. FIG. 2 shows a state where the shutter 18 is fully opened.

<<Interchangeable Lens>>

Figure 3:
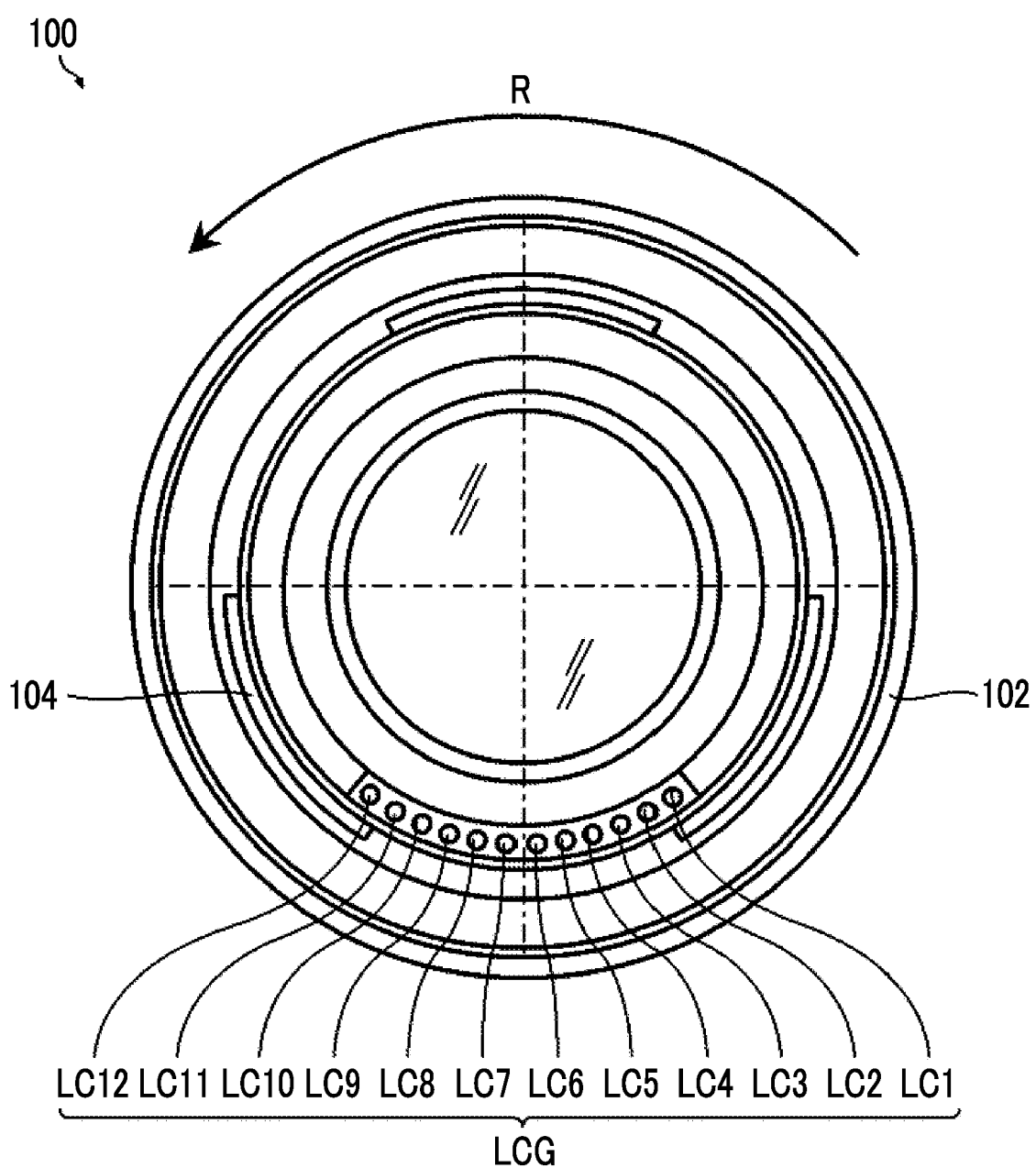
FIG. 3 is a back view of an interchangeable lens.

FIG. 3 is a back view of the interchangeable lens and a view of the interchangeable lens viewed from a mount side.

The interchangeable lens 100 comprises the lens-side mount 104 on the base end portion of a lens barrel 102 of the interchangeable lens 100. The lens-side mount 104 is composed of a bayonet mount corresponding to the camera-side mount 14 provided in the camera 10. In FIG. 3, a direction indicated by an arrow R (counterclockwise direction) is the rotation direction of the interchangeable lens 100 in the case where the interchangeable lens 100 is attached to the camera 10 (rotation direction of lens-side mount 104 in case where lens-side mount 104 is attached to camera-side mount 14).

The lens-side mount 104 is provided with a lens-side contact group LCG composed of a plurality of contacts LC1 to LC12. The lens-side contact group LCG is provided corresponding to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

In the case where the interchangeable lens 100 is attached to the camera 10, each of the contacts LC1 to LC12 of the lens-side contact group LCG is connected to the corresponding contacts CC1 to CC12 of the camera-side contact group CCG. That is, the first contact LC1 of the lens-side contact group LCG is connected to the first contact CC1 of the camera-side contact group CCG, the second contact LC2 of the lens-side contact group LCG is connected to the second contact CC2 of the camera-side contact group CCG, . . . , and the twelfth contact LC12 of the lens-side contact group LCG is connected to the twelfth contact CC12 of the camera-side contact group CCG.

A function of each of the contacts LC1 to LC12 constituting the lens-side contact group LCG will be described below.

<<Electric Configuration of Camera>>

Figure 4:
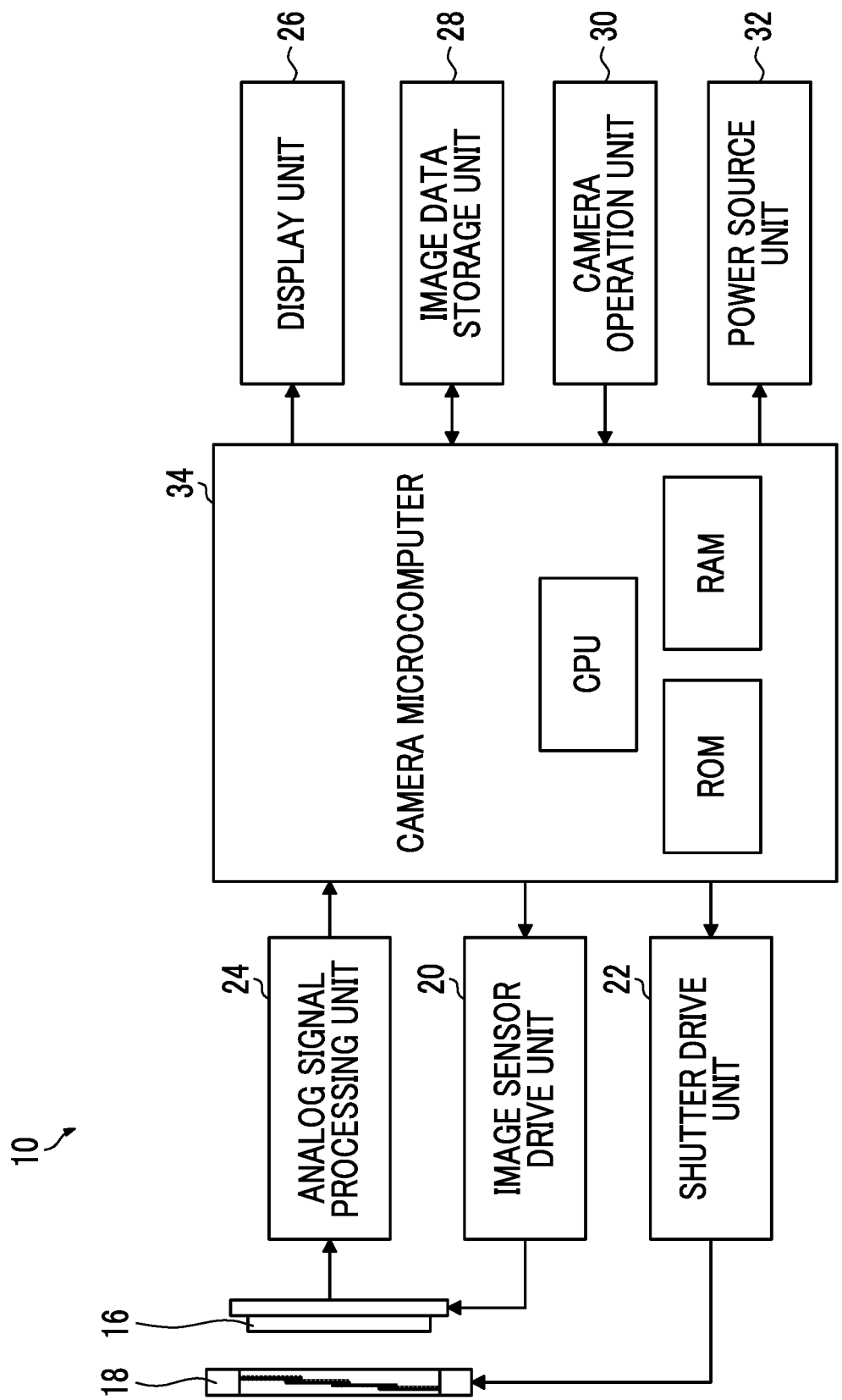
FIG. 4 is a block diagram showing an electric configuration of the camera.

FIG. 4 is a block diagram showing an electric configuration of the camera.

As shown in FIG. 4, the camera 10 comprises an image sensor 16, a shutter 18, an image sensor drive unit 20, a shutter drive unit 22, an analog signal processing section 24, a display unit 26, an image data storage unit 28, a camera operation unit 30, a power source unit 32, and a camera microcomputer 34.

<Image Sensor>

The image sensor 16 converts an optical image of a subject formed through the interchangeable lens into an electric signal and outputs the converted signal. A known image sensor such as a charged coupled device (CCD) image sensor or a complementary metal oxide semiconductor (CMOS) image sensor is used as the image sensor 16.

<Image Sensor Drive Unit>

The image sensor drive unit 20 is composed of a drive circuit of the image sensor 16. The image sensor drive unit 20 drives the image sensor 16 in response to an instruction from the camera microcomputer 34.

<Shutter>

The shutter 18 is an optical path opening and closing apparatus that adjusts an exposure time to the image sensor 16. As described above, the shutter 18 is composed of the square focal plane shutter and is disposed right before the image sensor 16.

<Shutter Drive Unit>

The shutter drive unit 22 is composed of a drive circuit that drives a charging motor, an electromagnetic, or the like provided in the shutter 18. The shutter drive unit 22 drives the charging motor, the electromagnetic, or the like in response to the instruction from the camera microcomputer 34.

<Analog Signal Processing Section>

The analog signal processing section 24 takes in an analog image signal output from the image sensor 16, performs predetermined signal processing (for example, correlative double sampling processing, amplifying processing, or the like), and then converts the analog image signal into a digital image signal and outputs the digital image signal.

<Display Unit>

The display unit 26 is composed of a monitor and a drive circuit of the monitor. The monitor is composed of, for example, a liquid crystal display (LCD) and is provided on a back surface of the camera body.

<Image Data Storage Unit>

The image data storage unit 28 is a storage unit of captured image data. The image data storage unit 28 comprises a memory card and a socket for attaching the memory card. Reading and writing of the image data with respect to the memory card are controlled by the camera microcomputer 34.

<Camera Operation Unit>

The camera operation unit 30 is an operation unit of the camera 10 and is composed of various operation buttons and a circuit that detects operation of the operation buttons and outputs operation signals to the camera microcomputer 34. The operation buttons provided in the camera 10 include a power button, a release button, and the like.

<Power Supply Unit>

The power source unit 32 generates and supplies pieces of power required for operations of the camera 10 and the interchangeable lens 100 under the control of the camera microcomputer 34.

Figure 5:
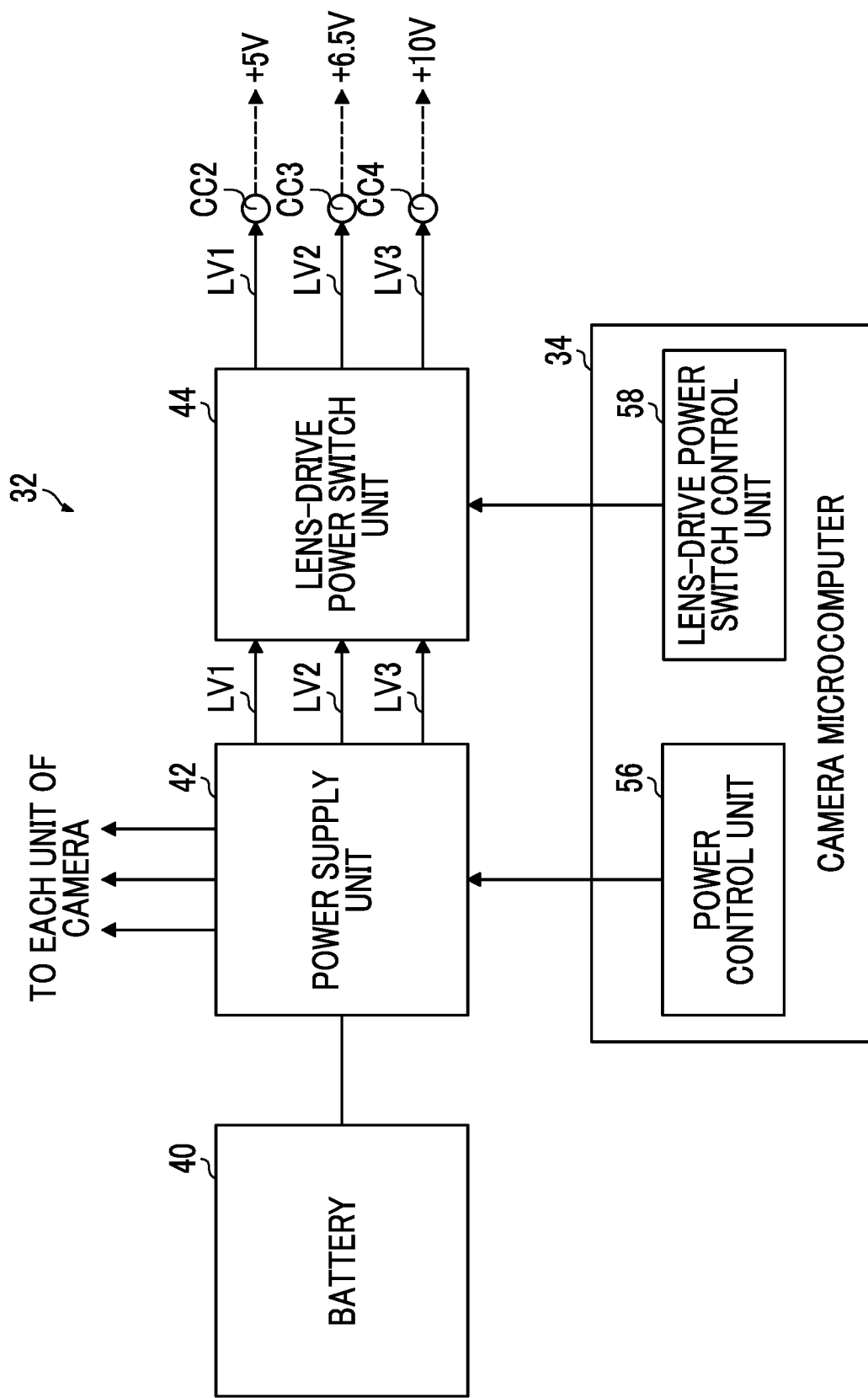
FIG. 5 is a block diagram showing an electric configuration of a power source unit.

FIG. 5 is a block diagram showing an electric configuration of the power source unit.

As shown in FIG. 5, the power source unit 32 comprises a battery 40, a power supply unit 42, and a lens-drive power switch unit 44.

The battery 40 is power of the camera 10 and the interchangeable lens 100. The battery 40 is attachably and detachably mounted on a battery chamber (not shown) provided in the camera body.

The power supply unit 42 generates various pieces of power required for the operations of the camera 10 and the interchangeable lens 100 from the battery 40 and supplies the pieces of power to each unit under the control of the camera microcomputer 34. The power supply unit 42 is composed of, for example, a DC-DC converter (DC: direct current).

In the camera 10 of the embodiment, a plurality of pieces of lens-drive power having different voltages are generated as the power supplied to the interchangeable lens 100. In the camera 10 of the embodiment, first lens-drive power LV1 having the voltage of +5 V, second lens-drive power LV2 having the voltage of +6.5 V, and third lens-drive power LV3 having the voltage of +10 V are generated.

As described below, the first lens-drive power LV1 having the lowest voltage is supplied to the second contact CC2 of the camera-side contact group CCG. The second lens-drive power LV2 is supplied to the third contact CC3 of the camera-side contact group CCG. The third lens-drive power LV3 having the highest voltage is supplied to the fourth contact CC4 of the camera-side contact group CCG.

The lens-drive power switch unit 44 individually turns on and off the supplying of the plurality of pieces of lens-drive power LV1, LV2, and LV3 to be supplied from the power supply unit 42 in response to the instruction from the camera microcomputer 34. Accordingly, it is possible to individually turn on and off the supplying of the pieces of lens-drive power LV1, LV2, and LV3 to be supplied from the power supply unit 42 to the plurality of contacts CC2, CC3, and CC4 of the camera-side contact group CCG.

<Camera Microcomputer>

The camera microcomputer 34 is an example of a camera control unit. The camera microcomputer 34 integrally controls the operation of the camera 10. The camera microcomputer 34 comprises a central processing unit (CPU), a read only memory (ROM), and a random access memory (RAM/memory capable of writing and reading data), and executes a prescribed program to provide various functions. The ROM stores various pieces of data and the like required for the control in addition to various programs executed by the CPU.

Figure 6:
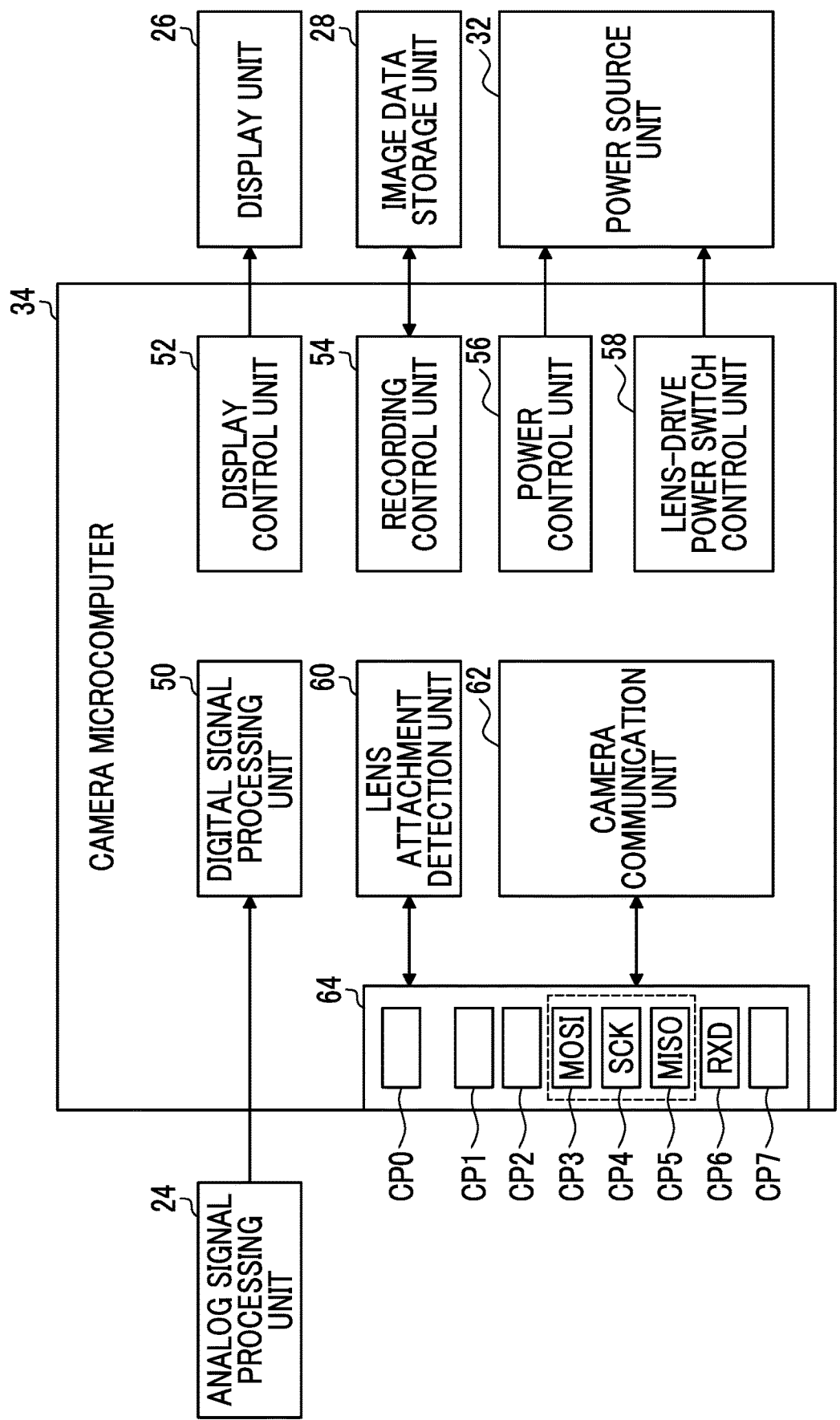
FIG. 6 is a block diagram showing an example of a function realized by a camera microcomputer.

FIG. 6 is a block diagram showing an example of a function realized by the camera microcomputer.

As shown in FIG. 6, the camera microcomputer 34 executes the prescribed program to function as a digital signal processing section 50, a display control unit 52, a recording control unit 54, a power control unit 56, a lens-drive power switch control unit 58, a lens attachment detection unit 60, a camera communication unit 62, and the like.

The digital signal processing section 50 takes in the digital image signal output from the analog signal processing section 24 and performs predetermined signal processing to generate the image data.

The display control unit 52 displays predetermined information on the monitor provided in the display unit 26. For example, in a case where a playback mode is set, an image read from the memory card is displayed on the monitor. Further, in a case where an imaging mode is set, an image captured by the image sensor 16 is displayed in real time.

Furthermore, in a case where various settings are performed, a setting screen is displayed on the monitor.

The recording control unit 54 performs the reading and writing of the image data with respect to the memory card attached to the socket of the image data storage unit 28.

The power control unit 56 controls the power supply unit 42 to control the supplying of the power to each unit.

The lens-drive power switch control unit 58 controls the lens-drive power switch unit 44 to control the supplying of the lens-drive power. Specifically, the lens-drive power switch control unit 58 individually turns on and off the supplying of the pieces of lens-drive power LV1, LV2, and LV3 to be supplied from the power supply unit 42 to the plurality of power contacts (second contact CC2, third contact CC3, and fourth contact CC4) of the camera-side contact group CCG to control the supplying of the lens-drive power. Accordingly, it is possible to selectively supply the lens-drive power.

The lens attachment detection unit 60 detects the attachment of the interchangeable lens 100. The lens attachment detection unit 60 detects a polarity of a lens detection port CP0 provided in a camera microcomputer input and output port 64 to determine the presence or absence of the attachment of the interchangeable lens 100.

The camera communication unit 62 communicates with the interchangeable lens 100 attached to the camera 10. The communication is performed through the camera microcomputer input and output port 64. The camera microcomputer input and output port 64 is provided with a plurality of communication ports CP1 to CP7 for communicating with the interchangeable lens 100.

Here, the first communication port CP1 is a communication port for notifying the camera 10 of a state from the interchangeable lens 100. In particular, the first communication port CP1 is used for giving a notification that a specific function of the interchangeable lens 100 is in an operation period in the camera system 1 of the embodiment.

The second communication port CP2 is a communication port for transmitting a vertical synchronizing (VSYNC) signal from the camera 10 to the interchangeable lens 100.

The third communication port CP3, the fourth communication port CP4, and the fifth communication port CP5 are communication ports for performing serial communication (three-line serial communication) with the interchangeable lens 100. That is, the third communication port CP3, the fourth communication port CP4, and the fifth communication port CP5 are the communication ports constituting a serial peripheral interface (SPI) which is a synchronous serial communication interface by three lines.

The third communication port CP3 is a communication port (master out slave in (MOSI) port) for transmitting a signal from the camera 10 as an SPI master to the interchangeable lens 100 as an SPI slave.

Further, the fourth communication port CP4 is a communication port (serial clock (SCK) port) for transmitting a clock signal for synchronization from the camera 10 as the SPI master to the interchangeable lens 100 as the SPI slave.

Further, the fifth communication port CP5 is a communication port (master in slave out (MISO) port) for transmitting a signal from the interchangeable lens 100 as an SPI slave to the camera 10 as an SPI master.

The sixth communication port CP6 is also a communication port for performing serial communication (single-line serial communication) with the interchangeable lens 100. In particular, in the camera system 1 of the embodiment, the sixth communication port CP6 functions as a received exchange data (RXD/data reception) port and is used as a communication port for receiving a signal transmitted from the interchangeable lens 100.

The seventh communication port CP7 is a communication port for notifying the camera 10 of the state from the interchangeable lens 100.

Further, the communication with the interchangeable lens 100 and an electric connection with the interchangeable lens 100 through the mount will be described below in detail.

<<Electric Configuration of Interchangeable Lens>>

Figure 7:
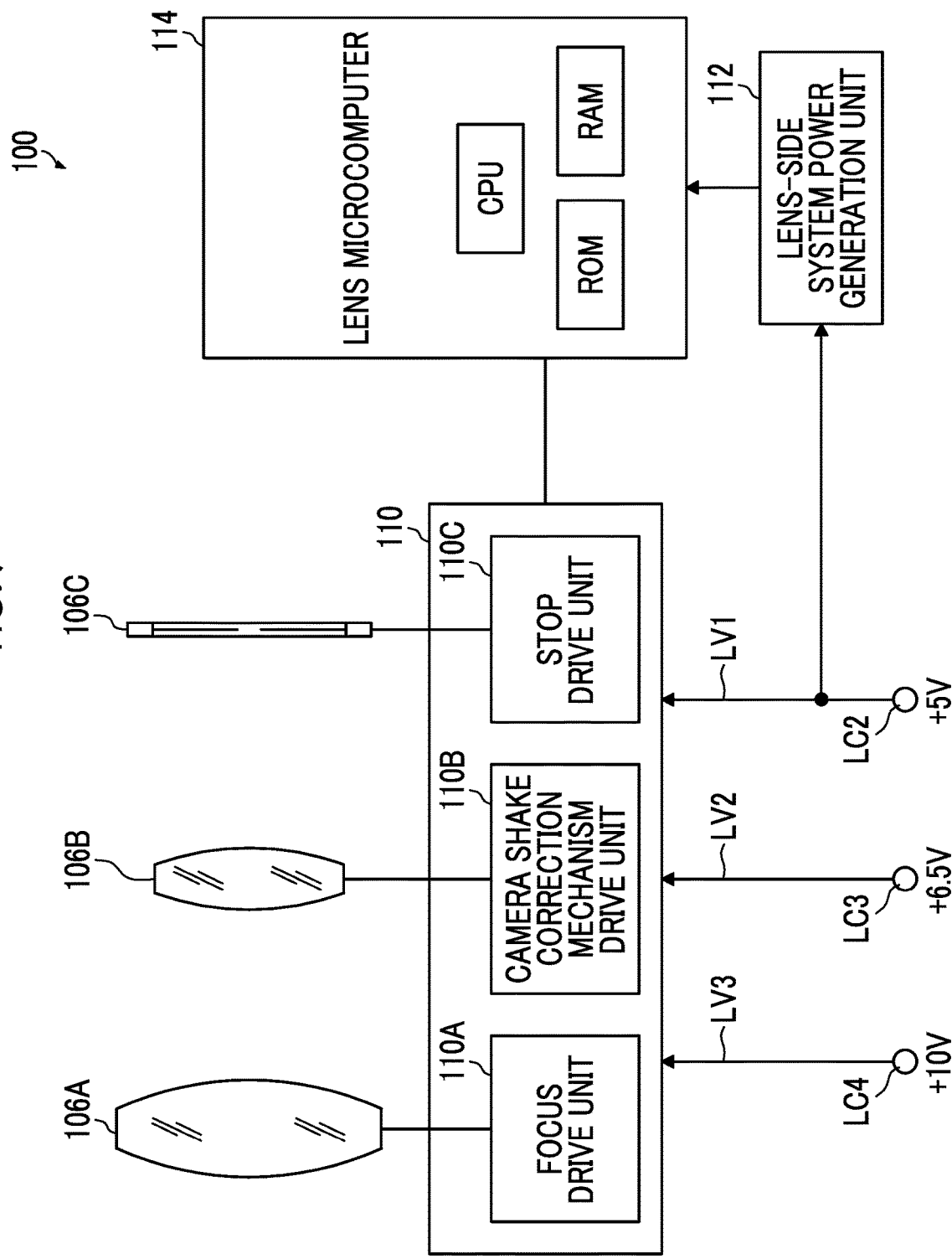
FIG. 7 is a block diagram showing an electric configuration of the interchangeable lens.

FIG. 7 is a block diagram showing an electric configuration of the interchangeable lens. FIG. 7 shows the electric configuration of the interchangeable lens comprising an auto focus (AF) mechanism, a camera shake correction mechanism, and the stop. Each interchangeable lens 100 comprises at least the AF mechanism and the stop, but there are interchangeable lenses not comprising the camera shake correction mechanisms.

As shown in FIG. 7, the interchangeable lens 100 comprises a lens drive unit 110, a lens-side system power generation unit 112, and a lens microcomputer 114.

<Lens Drive Unit>

The lens drive unit 110 drives optical members constituting the interchangeable lens 100 in response to an instruction from the lens microcomputer 114.

As described above, the interchangeable lens 100 shown in FIG. 7 comprises the AF function, the camera shake correction function, and the stop. Therefore, the interchangeable lens 100 of this example is provided with a focus drive unit 110A, a camera shake correction mechanism drive unit 110B, and a stop drive unit 110C as the lens drive unit 110.

The focus drive unit 110A is an example of an optical member drive unit and drives a focus lens 106A which is the optical member for focusing. The focus drive unit 110A is configured to comprise a focus motor (for example, ultrasonic motor) for driving the focus lens and a drive circuit of the focus motor. The focus drive unit 110A drives the focus motor in response to the instruction from the lens microcomputer 114 to operate the focus lens 106A.

The camera shake correction mechanism drive unit 110B is an example of the optical member drive unit and drives a camera shake correction lens 106B which is an optical member for camera shake correction. The camera shake correction mechanism drive unit 110B is configured to comprise a camera shake correction motor (for example, voice coil motor) for driving a camera shake correction lens and a drive circuit thereof. The camera shake correction mechanism drive unit 110B drives the camera shake correction motor in response to an instruction from the lens microcomputer 114 to operate the camera shake correction lens 106B.

The stop drive unit 110C is an example of the optical member drive unit and drives the stop which is the optical member for light amount adjustment. The stop drive unit 110C is configured to comprise the stop motor for driving a stop 106C and a drive circuit of the stop motor. The stop drive unit 110C drives the stop motor in response to the instruction from the lens microcomputer 114 to operate the stop 106C.

As described below, the plurality of pieces of lens-drive power LV1 (+5 V), LV2 (+6.5 V), and LV3 (+10 V) having different voltages are supplied from a plurality of contacts LC2 to LC4 (power contacts) of the lens-side contact group LCG to the lens drive unit 110. Any of the plurality of supplied pieces of lens-drive power LV1, LV2, and LV3 is supplied to each drive unit of the lens drive unit 110. For example, the third lens-drive power LV3 having the highest voltage is supplied to the focus drive unit 110A, and the first lens-drive power LV1 having the lowest voltage is supplied to the stop drive unit 110C. Further, the second lens-drive power LV2 having the intermediate voltage is supplied to the camera shake correction mechanism drive unit 110B.

<Lens-Side System Power Generation Unit>

The lens-side system power generation unit 112 generates system power for operating the lens microcomputer 114. The lens-side system power generation unit 112 generates the system power by using the lens-drive power to be supplied from the camera 10.

Here, the lens microcomputer 114 is configured to operate at a voltage lower than each drive unit constituting the lens drive unit 110. For example, the lens microcomputer 114 is configured to operate at +3.3 V.

The lens-side system power generation unit 112 generates the system power (+3.3 V) using the lens-drive power LV1 (+5 V) having the lowest voltage among the plurality of pieces of lens-drive power LV1 to LV3 to be supplied from the camera 10, and supplies the generated system power to the lens microcomputer 114. In this case, the lens-side system power generation unit 112 generates the system power by a voltage drop caused by a resistor. Accordingly, it is possible to prevent the occurrence of noise accompanied by the generation of the system power.

An LDO regulator may be exemplified as an apparatus that generates the system power by the voltage drop caused by the resistor. The LDO regulator is one of a linear regulator and converts an input voltage into a desired output voltage by consuming input power using on-resistance of a switching element such as a power MOSFET or power transistor.

<Lens Microcomputer>

The lens microcomputer 114 is an example of a lens control unit. The lens microcomputer 114 controls the operation of the interchangeable lens 100 based on the instruction from the camera microcomputer 34.

The lens microcomputer 114 comprises a CPU, a ROM, and a RAM, and executes a prescribed program to provide various functions. The ROM stores various pieces of data and the like required for the control in addition to various programs executed by the CPU.

Figure 8:
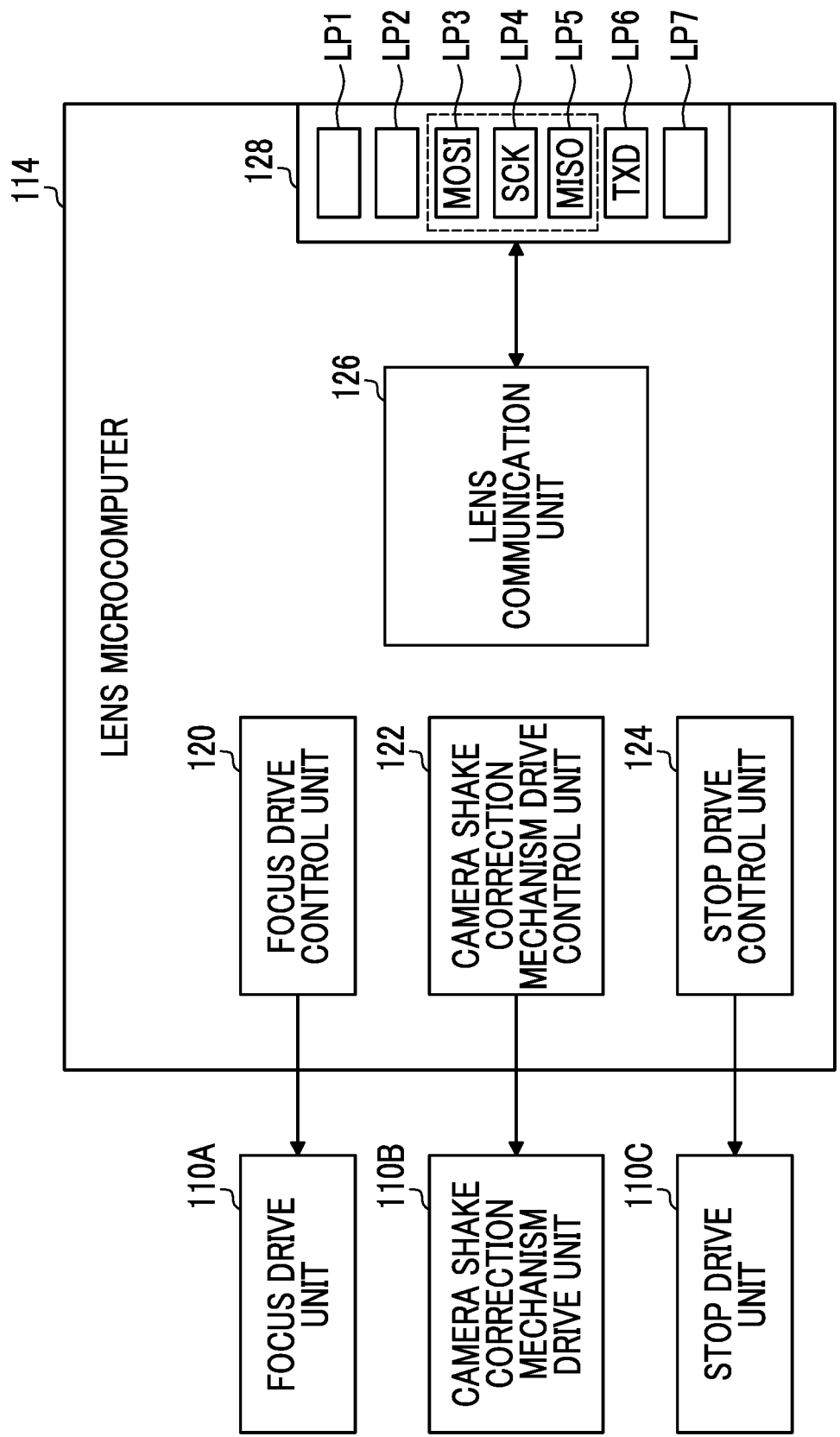
FIG. 8 is a block diagram showing an example of a function realized by a lens microcomputer.

FIG. 8 is a block diagram showing an example of a function realized by the lens microcomputer.

As shown in FIG. 8, the lens microcomputer 114 executes the prescribed program to function as a focus drive control unit 120, a camera shake correction mechanism drive control unit 122, a stop drive control unit 124, a lens communication unit 126, and the like.

The focus drive control unit 120 controls the focus drive unit 110A in response to the instruction from the camera microcomputer 34 to operate the focus lens 106A.

The camera shake correction mechanism drive control unit 122 controls the camera shake correction mechanism drive unit 110B in response to the instruction from the camera microcomputer 34 to operate the camera shake correction lens 106B.

The stop drive control unit 124 controls the stop drive unit 110C in response to the instruction from the camera microcomputer 34 to operate the stop 106C.

The lens communication unit 126 communicates with the camera 10 to which the interchangeable lens 100 is attached. The communication is performed through a lens microcomputer input and output port 128. The lens microcomputer input and output port 128 is provided with a plurality of communication ports LP1 to LP7 for communicating with the interchangeable lens 100. The communication ports LP1 to LP7 are provided corresponding to the plurality of communication ports CP1 to CP7 provided in the camera microcomputer input and output port 64 of the camera microcomputer 34.

Therefore, the first communication port LP1 is used for giving a notification the state of the camera 10, and the second communication port LP2 is used for receiving the VSYNC signal transmitted from the camera 10.

Further, the third communication port LP3, the fourth communication port LP4, and the fifth communication port LP5 are used for the serial communication (three-line serial communication) with the camera 10.

Further, the sixth communication port LP6 is used for the serial communication (single-line serial communication) with the camera and is used as a transmit exchange data (TXD/data transmission) port. That is, the sixth communication port LP6 is used as a communication port for transmitting the signal to the camera 10.

Further, the seventh communication port LP7 is used for notifying the camera 10 of the state.

The communication with the camera 10 and the electric connection to the camera 10 through the mount will be described below in detail.

<<Electric Connection between Camera and Interchangeable Lens>>

Figure 9:
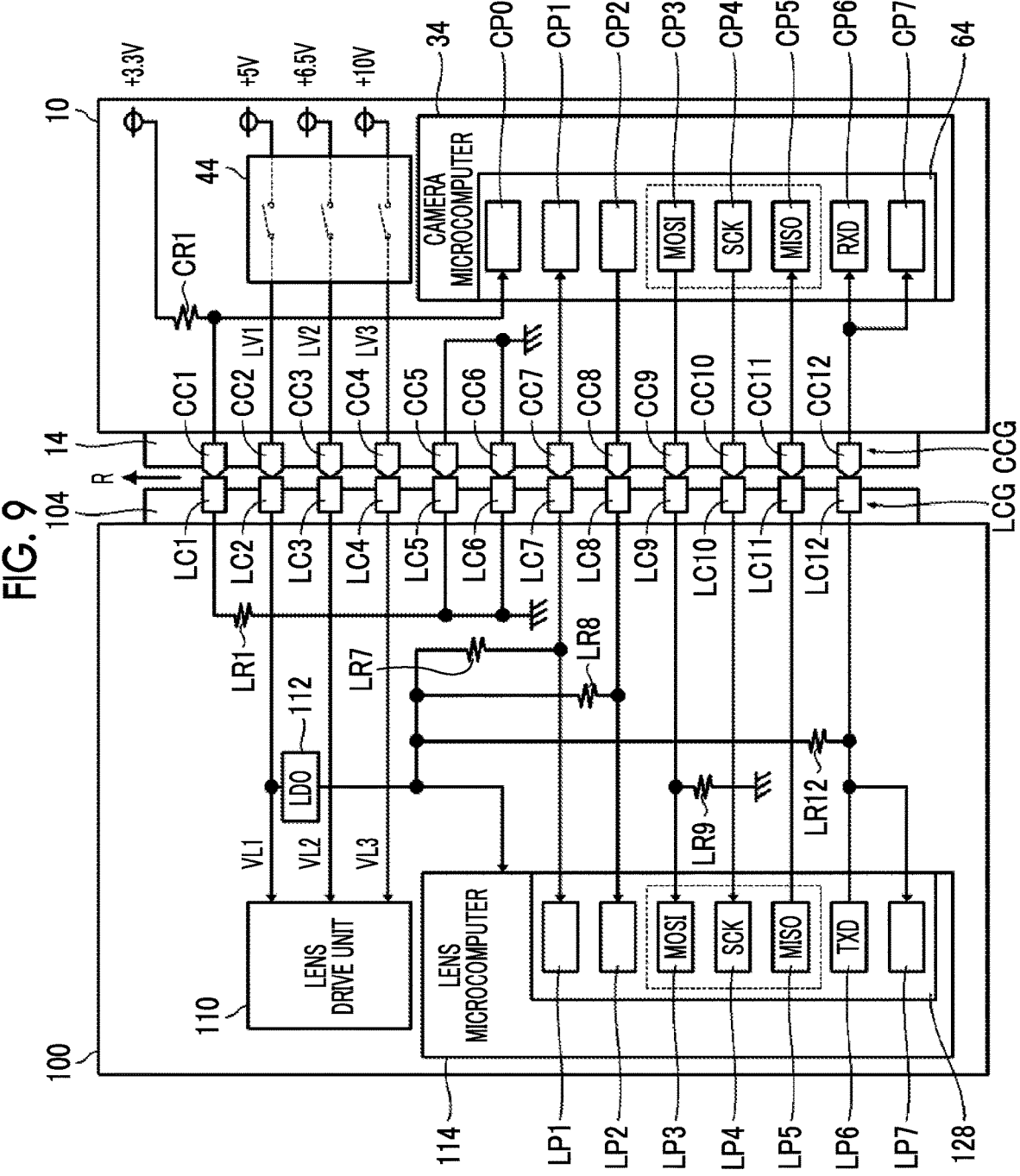
FIG. 9 is a diagram showing an electric connection between the camera and the interchangeable lens.

FIG. 9 is a diagram showing an electric connection between the camera and the interchangeable lens.

As shown in FIG. 9, the camera 10 and the interchangeable lens 100 are electrically connected through the camera-side contact group CCG provided in the camera-side mount 14 and the lens-side contact group LCG provided in the lens-side mount 104.

In FIG. 9, a direction indicated by an arrow R is the rotation direction of the interchangeable lens 100 in the case where the interchangeable lens 100 is attached to the camera 10. Therefore, in the case where the interchangeable lens 100 is attached to the camera 10, the lens-side contact group LCG moves in the direction indicated by the arrow R in FIG. 9 with respect to the camera-side contact group CCG.

<Camera-Side Contact Group>

The camera-side contact group CCG is composed of the twelve contacts CC1 to CC12. Each of the contacts CC1 to CC12 has the same shape and is disposed at a constant interval on the same circumference.

(A) First Contact CC1

The first contact CC1 is a lens detection contact for detecting the attachment of the interchangeable lens 100. The first contact CC1 is connected to the lens detection port CP0 of the camera microcomputer 34. Further, the first contact CC1 is connected to the power supply unit 42 (refer to FIG. 5) through a pull-up resistor CR1 and is pulled up to predetermined potential (for example, +3.3 V).

(B) Second Contact CC2 to Fourth Contact CC4

The second contact CC2, the third contact CC3, and the fourth contact CC4 are a plurality of power contacts for supplying the plurality of pieces of lens-drive power LV1, LV2, and LV3 to the interchangeable lens 100.

Here, the second contact CC2 is a first power contact for supplying the first lens-drive power LV1 to the interchangeable lens. The second contact CC2 is connected to the power supply unit 42 through the lens-drive power switch unit 44 (refer to FIG. 5). The first lens-drive power LV1 having the lowest voltage from the power supply unit 42 is supplied to the second contact CC2. The lens-drive power switch unit 44 turns on and off the supplying of the first lens-drive power LV1 to the second contact CC2 in response to the instruction from the camera microcomputer 34.

Further, the third contact CC3 is a second power contact for supplying the second lens-drive power LV2 to the interchangeable lens. The third contact CC3 is connected to the power supply unit 42 through the lens-drive power switch unit 44 (refer to FIG. 5). The second lens-drive power LV2 is supplied from the power supply unit 42 to the third contact CC3. The lens-drive power switch unit 44 turns on and off the supplying of the second lens-drive power LV2 to the third contact CC3 in response to the instruction from the camera microcomputer 34.

Further, the fourth contact CC4 is a third power contact for supplying the third lens-drive power LV3 to the interchangeable lens. The fourth contact CC4 is connected to the power supply unit 42 through the lens-drive power switch unit 44 (refer to FIG. 5). The third lens-drive power LV3 having the highest voltage from the power supply unit 42 is supplied to the fourth contact CC4. The lens-drive power switch unit 44 turns on and off the supplying of the third lens-drive power LV3 to the fourth contact CC4 in response to the instruction from the camera microcomputer 34.

(C) Fifth Contact CC5 and Sixth Contact CC6

The fifth contact CC5 and the sixth contact CC6 are respectively ground contacts and are both grounded.

(D) Seventh Contact CC7 to Twelfth Contact CC12

The seventh contact CC7 to the twelfth contact CC12 are communication contacts for communicating with the interchangeable lens 100.

Here, the seventh contact CC7 is the communication contact for giving a notification of the state from the interchangeable lens 100 to the camera 10. The seventh contact CC7 is connected to the first communication port CP1 of the camera microcomputer 34. As described above, the first communication port CP1 of the camera microcomputer 34 is used for giving a notification that the specific function of the interchangeable lens 100 is in the operation period.

The eighth contact CC8 is a communication contact for transmitting the VSYNC signal from the camera 10 to the interchangeable lens 100. The eighth contact CC8 is connected to the second communication port CP2 of the camera microcomputer 34.

The ninth contact CC9, the tenth contact CC10, and the eleventh contact CC11 are communication contacts for respectively performing the serial communication (three-line serial communication) with the interchangeable lens 100. The ninth contact CC9 is connected to the third communication port CP3 (MOSI port) of the camera microcomputer 34. The tenth contact CC10 is connected to the fourth communication port CP4 (SCK port) of the camera microcomputer 34. The eleventh contact CC11 is connected to the fifth communication port CP5 (MISO port) of the camera microcomputer 34.

The twelfth contact CC12 is a contact for performing the serial communication (single-line serial communication) with the interchangeable lens 100. Further, the twelfth contact CC12 is a contact for notifying the camera 10 of the state from the interchangeable lens 100. The twelfth contact CC12 is connected to the sixth communication port CP6 and the seventh communication port CP7 of the camera microcomputer 34.

The plurality of contacts CC1 to CC12 constituting the camera-side contact group CCG are disposed in an order of the first contact CC1, the second contact CC2, . . . , the eleventh contact CC11, and the twelfth contact CC12 with respect to the rotation direction R of the interchangeable lens 100 in the case where the interchangeable lens 100 is attached to the camera 10. Therefore, the camera-side contact group CCG is disposed in the order of the lens detection contact (first contact CC1), the plurality of power contacts (second contact CC2 to fourth contact CC4), the plurality of ground contacts (fifth contact CC5 and sixth contact CC6), and the plurality of communication contacts (seventh contact CC7 to twelfth contact CC12).

<Lens-Side Contact Group>

The lens-side contact group LCG corresponds to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

(A) First Contact LC1

The first contact LC1 is a lens detection contact corresponding to the lens detection contact (first contact CC1) on the camera side. Therefore, in the case where the interchangeable lens 100 is attached to the camera 10, the first contact LC1 is connected to the first contact CC1 on the camera side. The first contact LC1 is grounded through a pull-down resistor LR1 and is pulled down to ground potential.

(B) Second Contact LC2, Third Contact LC3, and Fourth Contact LC4

The second contact LC2, the third contact LC3, and the fourth contact LC4 are the plurality of power contacts corresponding to the plurality of power contacts (second contact CC2, third contact CC3, and fourth contact CC4) on the camera side. Therefore, in the case where the interchangeable lens 100 is attached to the camera 10, the second contact LC2 is connected to the second contact CC2 on the camera side and the third contact LC3 is connected to the third contact CC3 on the camera side. Further, the fourth contact LC4 is connected to the fourth contact CC4 on the camera side.

As described above, the second contact CC2 on the camera side is the first power contact for supplying the first lens-drive power LV1 (+5 V) having the lowest voltage. Therefore, in the case where the interchangeable lens 100 is attached to the camera 10, the first lens-drive power LV1 having the lowest voltage is supplied to the second contact LC2.

The lens-side system power generation unit 112 is connected to the second contact LC2 in the interchangeable lens. The lens-side system power generation unit 112 generates the system power (+3.3 V) using the first lens-drive power LV1 (+5 V) to be supplied from the second contact LC2 and supplies the generated system power to the lens microcomputer 114.

Further, the third contact CC3 on the camera side is the second power contact for supplying the second lens-drive power LV2 (+6.5 V). Therefore, in the case where the interchangeable lens 100 is attached to the camera 10, the second lens-drive power LV2 is supplied to the third contact LC3.

Further, the fourth contact CC4 on the camera side is the third power contact for supplying the lens-drive power LV3 (+10 V) having the highest voltage. Therefore, in the case where the interchangeable lens 100 is attached to the camera 10, the third lens-drive power LV3 having the highest voltage is supplied to the fourth contact CC4 on the camera side.

(C) Fifth Contact LC5 and Sixth Contact LC6

The fifth contact LC5 and the sixth contact LC6 are two ground contacts respectively corresponding to the two ground contacts (fifth contact CC5 and sixth contact CC6) on the camera side. Therefore, in the case where the interchangeable lens 100 is attached to the camera 10, the fifth contact LC5 is connected to the fifth contact CC5 on the camera side, and the sixth contact LC6 is connected to the sixth contact CC6 on the camera side.

(D) Seventh Contact LC7 to Twelfth Contact LC12

The seventh contact LC7 to the twelfth contact LC12 are the plurality of communication contacts corresponding to the plurality of communication contacts (seventh contact CC7 to twelfth contact CC12) on the camera side. Therefore, in the case where the interchangeable lens 100 is attached to the camera 10, the seventh contact LC7 is connected to the seventh contact CC7 on the camera side, and the eighth contact LC8 is connected to the eighth contact CC8 on the camera side. Further, the ninth contact LC9 is connected to the ninth contact CC9 on the camera side, and the tenth contact LC10 is connected to the tenth contact CC10 on the camera side. Furthermore, the eleventh contact LC11 is connected to the eleventh contact CC11 on the camera side, and the twelfth contact LC12 is connected to the twelfth contact CC12 on the camera side.

As described above, the seventh contact CC7 on the camera side is the communication contact for giving the notification of the state from the interchangeable lens 100 to the camera 10. Therefore, the seventh contact LC7 is also used as the communication contact for giving the notification of the state from the interchangeable lens 100 to the camera 10. The seventh contact LC7 is connected to the first communication port LP1 of the lens microcomputer 114.

Further, the eighth contact CC8 on the camera side is a communication contact for transmitting the VSYNC signal from the camera 10 to the interchangeable lens 100. Therefore, the eighth contact LC8 is used as a communication contact for receiving the VSYNC signal transmitted from the camera-side. The eighth contact LC8 is connected to the second communication port LP2 of the lens microcomputer 114.

Further, the ninth contact CC9, the tenth contact CC10, and the eleventh contact CC11 on the camera side are communication contacts for respectively performing the serial communication (three-line serial communication) with the interchangeable lens 100. Therefore, the ninth contact LC9, the tenth contact LC10, and the eleventh contact LC11 are also used as the communication contacts for performing the serial communication (three-line serial communication) with the camera 10. The ninth contact LC9 is connected to the third communication port LP3 of the lens microcomputer 114. The tenth contact LC10 is connected to the fourth communication port LP4 of the lens microcomputer 114. The eleventh contact LC11 is connected to the fifth communication port LP5 of the lens microcomputer 114.

Further, the twelfth contact CC12 on the camera side is a contact for performing the serial communication (single-line serial communication) with the interchangeable lens 100 and a contact for notifying the camera 10 of the state from the interchangeable lens 100. Therefore, the twelfth contact LC12 is also used as the contact for performing the serial communication (single-line serial communication) with the camera 10 and the contact for notifying the camera 10 of the state. The twelfth contact LC12 is connected to the sixth communication port LP6 and the seventh communication port LP7 of the lens microcomputer 114.

As shown in FIG. 9, the seventh contact LC7, the eighth contact LC8, and the twelfth contact LC12 among the plurality of contacts (seventh contact LC7 to twelfth contact LC12) constituting the communication contact are respectively connected to the lens-side system power generation unit 112 through pull-up resistors LR7, LR8, and LR12, and are pulled up to potential (for example, +3.3 V) of the system power to be supplied from the lens-side system power generation unit 112.

Further, the ninth contact LC9 among the plurality of contacts (seventh contact LC7 to twelfth contact LC12) constituting the communication contact is grounded through a pull-down resistor LR9 and is pulled down to the ground potential.

The plurality of contacts LC1 to LC12 constituting the lens-side contact group LCG are also disposed in the same arrangement as the plurality of contacts CC1 to CC12 constituting the camera-side contact group CCG. That is, the plurality of contacts LC1 to LC12 are disposed in an order of the first contact LC1, the second contact LC2, . . . , the eleventh contact LC11, and the twelfth contact LC12 with respect to the rotation direction R of the interchangeable lens 100 in the case where the interchangeable lens 100 is attached to the camera 10. Therefore, the lens-side contact group LCG is also disposed in the order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12).

[Action of Camera System]

<<Attachment of Interchangeable Lens>>

The lens-side mount 104 provided in the interchangeable lens 100 is attached to the camera-side mount 14 provided in the camera 10 to attach the interchangeable lens 100 to the camera 10. In this case, the interchangeable lens 100 is rotated with respect to the camera 10 for the attachment.

The interchangeable lens 100 is attached to the camera 10 to connect the lens-side contact group LCG provided in the lens-side mount 104 to the camera-side contact group CCG provided in the camera-side mount 14.

In the case where the interchangeable lens 100 is attached to the camera 10, the lens-side contact group LCG is disposed in an order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12) along the rotation direction. Therefore, it is possible for the power contacts (second contact LC2 to fourth contact LC4) to touch more contacts of the camera-side contact group CCG. Accordingly, it is possible to improve a self-cleaning effect of the plurality of power contacts (second contact LC2 to fourth contact LC4) of the lens-side contact group LCG. As a result, it is possible to reduce touch resistance of the plurality of power contacts (second contact LC2 to fourth contact LC4) of the lens-side contact group LCG and thus to efficiently supply the power.

<<Detection of Interchangeable Lens Attachment>>

The camera microcomputer 34 detects the presence or absence of the attachment of the interchangeable lens 100 based on the polarity of the first contact (lens detection contact) CC1 of the camera-side contact group CCG.

In a case where the interchangeable lens 100 is not attached, the first contact CC1 on the camera side is pulled up by the pull-up resistor CR1 and thus is at the HIGH level (high potential).

On the other hand, in the case where the interchangeable lens 100 is attached to the camera 10, the first contact (lens detection contact) LC1 on the interchangeable lens side is connected to the first contact CC1 on the camera side as shown in FIG. 9. Since the first contact LC1 on the interchangeable lens side is grounded, in a case where the first contact LC1 on the interchangeable lens side is connected to the first contact CC1 on the camera side, the first contact CC1 on the camera side is at the LOW level (low potential).

The camera microcomputer 34 detects the presence or absence of the attachment of the interchangeable lens 100 based on the polarity (HIGH level or LOW level) of the lens detection port CP0 connected to the first contact CC1 on the camera side. That is, it is determined that the interchangeable lens 100 is not attached in a case where potential of the lens detection port CP0 is at the HIGH level, and it is discriminated that the interchangeable lens 100 is attached in a case where potential of the lens detection port CP0 is at the LOW level to detect the presence or absence of the attachment of the interchangeable lens 100.

The first contact CC1 which is the lens detection contact is disposed at a head of the rotation direction R of the interchangeable lens 100 in the case where the interchangeable lens 100 is attached to the camera 10. Accordingly, it is possible to prevent the contact other than the first contact LC1 on the interchangeable lens side from touching the first contact CC1 on the camera side in a case where the interchangeable lens 100 is attached and detached. Accordingly, it is possible to prevent erroneous detection.

<<Activation of Lens Microcomputer>>

In a case where the attachment of the interchangeable lens 100 is detected, the camera microcomputer 34 starts the supplying of the lens-drive power to the power supply unit 42. That is, the camera microcomputer 34 controls the power supply unit 42 and the lens-drive power switch unit 44 such that the pieces of lens-drive power LV1, LV2, and LV3 are supplied to the plurality of power contacts (second contact CC2, third contact CC3, and fourth contact CC4) on the camera side. Accordingly, the pieces of lens-drive power LV1, LV2, and LV3 are respectively supplied to the plurality of power contacts (second contact CC2, third contact CC3, and fourth contact CC4) on the camera side.

Further, in a case where the pieces of lens-drive power LV1, LV2, and LV3 are supplied to the plurality of power contacts (second contact CC2, third contact CC3, and fourth contact CC4) on the camera side, the pieces of lens-drive power LV1, LV2, and LV3 are supplied to the interchangeable lens 100 through the plurality of power contacts (second contact LC2, third contact LC3, and fourth contact LC4) on the interchangeable lens side connected to the plurality of power contacts (second contact CC2, third contact CC3, and fourth contact CC4) on the camera side.

In a case where the pieces of lens-drive power LV1, LV2, and LV3 are supplied to the interchangeable lens 100, the system power of the lens microcomputer 114 is generated using one of the pieces of lens-drive power LV1, LV2, and LV3. The system power of the lens microcomputer 114 is generated by the lens-side system power generation unit 112. The lens-side system power generation unit 112 generates the system power (+3.3 V) using the first lens-drive power LV1 (+5 V) having the lowest voltage among the plurality of pieces of lens-drive power LV1, LV2, and LV3 supplied from the camera-side, and supplies the generated system power to the lens microcomputer 114.

In a case where the system power is normally supplied to the lens microcomputer 114, the lens microcomputer 114 is activated.

<<Detection of Normal Supplying of System Power to Lens Microcomputer>>

The camera microcomputer 34 detects that the system power is normally supplied to the lens microcomputer 114 based on the polarity of a specific contact of the camera-side contact group CCG. The specific contact herein refers to a contact to be connected to the contact to which the pull-up resistor is connected on the interchangeable lens side.

On the interchangeable lens-side, the contacts to which the pull-up resistors LR7, LR8, and LR12 are connected are the seventh contact LC7, the eighth contact LC8, and the twelfth contact LC12. The contacts on the camera side to be connected to these contacts are the seventh contact CC7, the eighth contact CC8, and the twelfth contact CC12.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, and the sixth communication port CP6 to be connected to the twelfth contact CC12 of the camera-side contact group CCG to detect that the system power is normally supplied to the lens microcomputer 114. Specifically, in a case where it is detected that the polarities of the first communication port CP1, the second communication port CP2, and the sixth communication port CP6 are at the HIGH level, it is determined that the system power is normally supplied to the lens microcomputer 114. Accordingly, it is possible to appropriately detect that the system power is normally supplied to the lens microcomputer 114 on the camera side even in the case where the system power of the lens microcomputer 114 is generated on the interchangeable lens side. In particular, more accurate detection is possible by discriminating the polarities of the plurality of contacts as in the camera system 1 of the embodiment.

<<Discrimination whether Interchangeable Lens is Regular Product>>

The camera microcomputer 34 discriminates whether the attached interchangeable lens 100 is a regular interchangeable lens based on the polarities of the specific contacts of the camera-side contact group CCG. The specific contacts herein are the contacts to be connected to the contacts to which the pull-up resistors LR7, LR8, and LR12 are connected, and the contact to which the pull-down resistor LR9 is connected on the interchangeable lens side.

On the interchangeable lens-side, the contacts to which the pull-up resistors LR7, LR8, and LR12 are connected are the seventh contact LC7, the eighth contact LC8, and the twelfth contact LC12. The contacts on the camera side to be connected to these contacts are the seventh contact CC7, the eighth contact CC8, and the twelfth contact CC12.

Further, the contact to which the pull-down resistor LR9 is connected is the ninth contact LC9 on the interchangeable lens side. The contact on the camera side to be connected to this contact is the ninth contact CC9.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, the third communication port CP3 to be connected to the ninth contact CC9 of the camera-side contact group CCG, and the sixth communication port CP6 to be connected to the twelfth contact CC12 of the camera-side contact group CCG to discriminate whether the attached interchangeable lens 100 is the regular interchangeable lens. Specifically, in a case where the it is detected that polarities of the first communication port CP1, the second communication port CP2, and the sixth communication port CP6 are at the HIGH level and the polarity of the third communication port CP3 is at the LOW level, the camera microcomputer 34 discriminates that the attached interchangeable lens 100 is the regular interchangeable lens.

In this manner, it is possible to easily discriminate whether the attached interchangeable lens 100 is the regular interchangeable lens by discriminating the polarities of the specific contacts at the time of attaching the interchangeable lens 100.

<<Acquisition of Lens Information>>

In the case where the interchangeable lens 100 is attached to the camera 10, the camera microcomputer 34 acquires the lens information from the interchangeable lens 100.

The lens information refers to information indicating a specification of the interchangeable lens 100. The lens information includes, for example, lens model data, lens characteristic data, lens characteristic correction data, and the like. The lens model data includes a lens model name, a focal length, a maximum F-number, a maker name, and the like. The lens characteristic data includes brightness shading data, color shading data, distortion data, aberration data, and the like. The lens characteristic correction data includes brightness shading correction data, color shading correction data, distortion correction data, aberration correction data, and the like. The lens information is stored in the ROM of the lens microcomputer 114.

In the case where the lens microcomputer 114 is activated, the lens information is transmitted to the camera 10. The camera microcomputer 34 receives the lens information transmitted from the interchangeable lens 100 to acquire the lens information on the attached interchangeable lens 100. The transmission of the lens information is performed by unidirectional serial communication through the twelfth contact LC12 of the lens-side contact group LCG and the twelfth contact CC12 of the camera-side contact group CCG.

In the case where the lens microcomputer 114 is activated, the lens information is output from the sixth communication port LP6 (TXD port). The lens information output from the sixth communication port LP6 of the lens microcomputer 114 is transmitted through the twelfth contact LC12 of the lens-side contact group LCG and the twelfth contact CC12 of the camera-side contact group CCG to be input to the sixth communication port CP6 (RXD port) of the camera microcomputer 34. Accordingly, the lens information on the attached interchangeable lens 100 is acquired on the camera side.

In a case where the transmission and reception of the lens information are completed, the twelfth contact CC12 of the camera-side contact group CCG and the twelfth contact LC12 of the lens-side contact group LCG are switched to a function as the contacts for notifying the camera 10 of the state from the interchangeable lens 100.

<<Communication Setting>>

In the case where the interchangeable lens 100 is attached to the camera 10, processing (communication setting) for establishing the synchronous serial communication by three lines between the camera microcomputer 34 and the lens microcomputer 114.

In a case where the activation of the lens microcomputer 114 is confirmed, the camera microcomputer 34 communicates with the lens microcomputer 114 through the contacts (ninth contact CC9, tenth contact CC10, and eleventh contact CC11 of camera-side contact group CCG and ninth contact LC9, tenth contact LC10, and eleventh contact LC11 of lens-side contact group LCG) for the three-line serial communication to perform the processing for establishing the three-line synchronous serial communication. This processing is performed in parallel with the transmission and reception of the lens information. Accordingly, it is possible to speed up the activation of the interchangeable lens 100.

<<Interchangeable Lens Drive (Power Supply Method)>>

In a case where the communication is established between the camera microcomputer 34 and the lens microcomputer 114, the interchangeable lens 100 is at a standby state. Hereinafter, the operation is possible in response to the instruction from the camera 10.

The lens microcomputer 114 communicates with the camera microcomputer 34 using the contacts for the three-line serial communication to receive an instruction from the camera microcomputer 34. The lens microcomputer 114 controls the lens drive unit 110 in response to the received instruction to operate the interchangeable lens 100.

In this case, the lens drive unit 110 operates by receiving the supplying of the power (lens-drive power) from the camera 10. The plurality of pieces of lens-drive power are supplied through the plurality of power contacts (second contact CC2 to fourth contact CC4 on camera-side and second contact LC2 to fourth contact LC4 on interchangeable lens-side). Each of the pieces of lens-drive power LV1, LV2, and LV3 has different voltage and is supplied to the corresponding drive unit. For example, in the interchangeable lens 100 provided with the focus drive unit 110A, the camera shake correction mechanism drive unit 110B, and the stop drive unit 110C, the first lens-drive power LV1 (+5 V) having the lowest voltage is supplied to the stop drive unit 110C. Further, the second lens-drive power LV2 (+6.5 V) having the intermediate voltage is supplied to the camera shake correction mechanism drive unit 110B. Further, the third lens-drive power LV3 (+10 V) having the highest voltage is supplied to the focus drive unit 110A.

In this manner, since the power having the voltage corresponding to each drive unit is supplied from the camera-side, there is no need to generate the power on the interchangeable lens side and thus it is possible to simplify the configuration of the interchangeable lens 100. Further, since noise countermeasure is also unnecessary, it is possible to further simplify the configuration of the interchangeable lens 100.

Furthermore, it is possible to efficiently supply the pieces of power to the lens by supplying the pieces of power to the interchangeable lens through the plurality of power contacts. For example, in a case where large power is required on the interchangeable lens side, a loss in a contact portion becomes large in a case where the power is supplied from one power contact. However, it is possible to reduce the loss in the contact portion by employing the configuration of supplying the pieces of power to the interchangeable lens through the plurality of power contacts and thus to efficiently supply the pieces of power. That is, it is possible to obtain a large contact area by employing the configuration of supplying the pieces of power to the interchangeable lens through the plurality of power contacts and thus to efficiently supply the pieces of power due to the reduction of the loss.

In the camera system 1 of the embodiment, the contacts for the system power can be removed whereas the number of the power contacts increases. Therefore, it is also possible to suppress the increase in the number of contacts.

<<Individual on and Off of Lens-Drive Power>>

As described above, the plurality of pieces of lens-drive power having different voltages are supplied from the camera 10 to the interchangeable lens 100.

However, not all of the pieces of lens-drive power are always used depending on the interchangeable lens 100, and there is a case where only a part of the pieces of lens-drive power is used. For example, in a case where each drive unit operates at the same operation voltage or the like, pieces of lens-drive power having operation voltages other than the operation voltage are not used.

The supplying of the pieces of lens-drive power having the voltages unused on the interchangeable lens side is stopped. Accordingly, it is possible to achieve power saving.

Which voltage lens-drive power is required is different for each interchangeable lens. The camera microcomputer 34 discriminates the lens-drive power having the required voltage based on the lens information acquired from the interchangeable lens 100 to supply only the lens-drive power having the required voltage from the power supply unit 42 to the lens. Specifically, the processing is performed as follows.

First, lens-drive power having a voltage required for the attached interchangeable lens 100 is discriminated based on the lens information acquired from the interchangeable lens 100. The ROM provided in the camera microcomputer 34 stores a determination table, and the camera microcomputer 34 discriminates the lens-drive power having the voltage required for the attached interchangeable lens 100 with reference to the determination table. Information on the lens-drive power having the required voltage is associated with each interchangeable lens (lens model name) constituting the camera system 1 and is recorded in the determination table.

Next, the camera microcomputer 34 controls the lens-drive power switch unit 44 based on a discrimination result to stop the supplying of the lens-drive power unused on the interchangeable lens side. For example, in a case where the second lens-drive power LV2 having the intermediate voltage is unused on the interchangeable lens side, the supplying of the second lens-drive power LV2 is stopped. Accordingly, only a required lens-drive power is supplied.

Since the first lens-drive power LV1 having the lowest voltage is used for the system power of the lens microcomputer 114, the first lens-drive power LV1 having the lowest voltage is lens-drive power that is used always. Therefore, the power whose supplying is actually stopped is the second lens-drive power LV2 having the intermediate voltage or the third lens-drive power LV3 having the highest voltage.

In this manner, it is possible to efficiently supply the power and thus to achieve power saving by stopping the supplying of the lens-drive power unused on the interchangeable lens side.

The lens-drive power having the required voltage is discriminated with reference to the determination table provided on the camera side in this example, but the lens information transmitted from the interchangeable lens may include the lens-drive power having the required voltage.

<<Detachment of Interchangeable Lens>>

In a case where the interchangeable lens 100 is detached from the camera 10, the interchangeable lens 100 is rotated and detached in a direction opposite to the direction in which the interchangeable lens 100 is attached to detach the interchangeable lens 100 from the camera 10. In this case, it is possible to safely detach the interchangeable lens 100 by disposing the power contacts of the interchangeable lens 100 (second contact LC2, third contact LC3, and fourth contact LC4) on the rear side in the rotation direction (front side with respect to rotation direction R at the time of attaching interchangeable lens 100) with respect to the ground contacts of the interchangeable lens 100 (fifth contact LC5 and sixth contact LC6).

That is, the power contacts of the interchangeable lens 100 touch the ground contacts of the camera 10 immediately after the interchangeable lens 100 is rotated in the detached direction by disposing the power contacts adjacent to the rear side of the ground contacts with respect to the rotation direction at the time of detaching the interchangeable lens 100. That is, the power contacts of the interchangeable lens 100 touch the ground contacts of the camera 10 without touching other contacts. Accordingly, it is possible to appropriately process charges remaining in the power contacts and the lines of the power contacts and thus to safely detach the interchangeable lens 100.

Further, it is possible to appropriately process charges remaining on the interchangeable lens side even in a case where the power contacts touch each other by disposing the plurality of power contacts in the descending order of the voltage with respect to the rotation direction at the time of detaching the interchangeable lens 100 (ascending order with respect to rotation direction R at the time of attaching interchangeable lens 100). That is, in the case where the interchangeable lens 100 is rotated to be detached, the power contacts on the interchangeable lens side always touch the power contacts on the camera side that supply the pieces of power having the voltages higher than the power contacts on the interchangeable lens side or the ground contacts. Therefore, even in the case where the charges remain in the power contacts on the interchangeable lens side and in the lines thereof, it is possible to appropriately process the charges. Accordingly, it is possible to safely detach the interchangeable lens 100.

Second Embodiment

[Configuration of Camera System]

Figure 10:
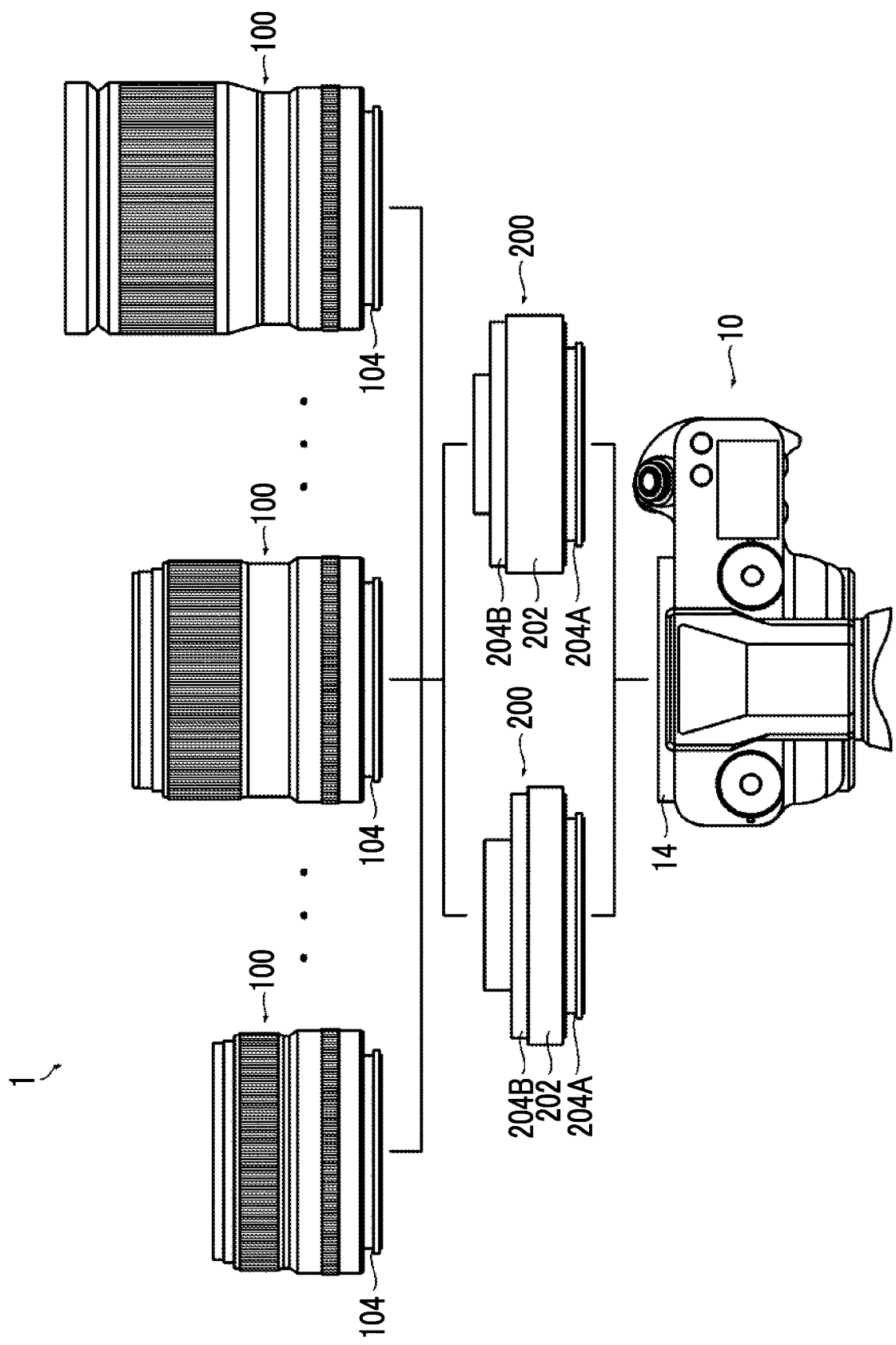
FIG. 10 is a system configuration diagram according to a second embodiment of the lens-interchangeable camera system.

FIG. 10 is a system configuration diagram according to a second embodiment of the lens-interchangeable camera system.

As shown in FIG. 10, the camera system 1 of the embodiment further comprises an accessory 200 to be attachably and detachably attached between the camera 10 and the interchangeable lens 100. At least one accessory 200 is provided. In the embodiment, two accessories 200 are provided. The accessory 200 is composed of, for example, an extender, an extension tube, or the like. In the embodiment, both of the two accessories 200 are composed of the extender. In this case, extender lenses are provided. One of the two accessories 200 is composed of the extender that extends the focal length by 1.4 times, and the other is composed of the extender that extends the focal length by 2 times.

<<Appearance Configuration of Accessory>>

The accessory 200 comprises an accessory-side first mount 204A on a base end side of a barrel 202 thereof and comprises an accessory-side second mount 204B on a front end side thereof.

The accessory-side first mount 204A is a mount for attaching the accessory 200 to the camera 10. The accessory-side first mount 204A has the same structure as the lens-side mount 104 provided in the interchangeable lens 100.

The accessory-side second mount 204B is a mount for attaching the interchangeable lens 100 to the accessory 200.

The accessory-side second mount 204B has the same structure as the camera-side mount 14 provided in the camera 10.

The accessory 200 is attached to the camera 10 through the accessory-side first mount 204A. In the camera 10 to which the accessory 200 is attached, the interchangeable lens 100 is attached to the accessory-side second mount 204B of the accessory 200.

<<Electric Configuration of Accessory>>

Figure 11:
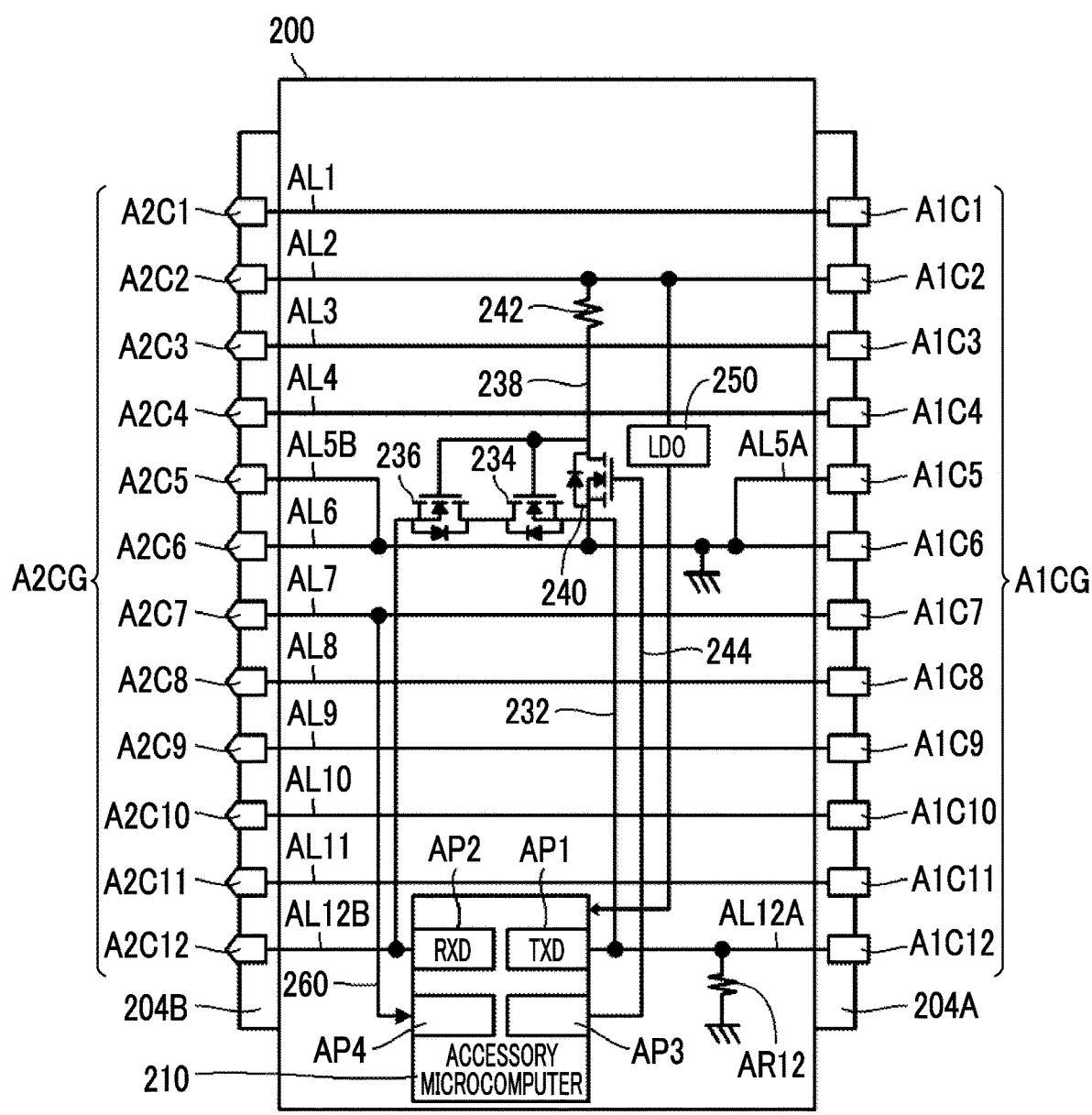
FIG. 11 is a diagram showing an electric configuration of an accessory.

FIG. 11 is a diagram showing an electric configuration of an accessory.

<Accessory-Side First Contact Group and Accessory-Side Second Contact Group>

(A) Accessory-Side First Contact Group

The accessory-side first mount 204A of the accessory 200 is provided with an accessory-side first contact group A1CG composed of a plurality of contacts A1C1 to A1C12. The accessory-side first contact group A1CG is provided corresponding to the camera-side contact group CCG. Therefore, the accessory-side first contact group A1CG is configured to have the same number of contacts as the contacts constituting the camera-side contact group CCG, and each of the contacts A1C1 to A1C12 is disposed at the same interval as the contacts CC1 to CC12 constituting the camera-side contact group CCG.

In the case where the accessory 200 is attached to the camera 10, each of the contacts A1C1 to A1C12 of the accessory-side first contact group A1CG is connected to the corresponding contacts CC1 to CC12 of the camera-side contact group CCG. That is, the first contact A1C1 of the accessory-side first contact group A1CG is connected to the first contact CC1 of the camera-side contact group CCG, the second contact A1C2 of the accessory-side first contact group A1CG is connected to the second contact CC2 of the camera-side contact group CCG, . . . , and the twelfth contact A1C12 of the accessory-side first contact group A1CG is connected to the twelfth contact CC12 of the camera-side contact group CCG.

Since the first contact CC1 of the camera-side contact group CCG constitutes the lens detection contact, the first contact A1C1 of the accessory-side first contact group A1CG also constitutes the lens detection contact.

Further, since the second contact CC2, the third contact CC3, and the fourth contact CC4 of the camera-side contact group CCG respectively constitute the power contacts, the second contact A1C2, the third contact A1C3, and the fourth contact A1C4 of the accessory-side first contact group A1CG also respectively constitute the corresponding power contacts.

The second contact A1C2 is a contact that supplies the lens-drive power LV1 having the lowest voltage, and the fourth contact A1C4 is a contact that supplies the lens-drive power LV3 having the highest voltage. Further, the third contact A1C3 is a contact that supplies the lens-drive power LV2 having the intermediate voltage.

Further, since the fifth contact CC5 and the sixth contact CC6 of the camera-side contact group CCG respectively constitute the ground contacts, the fifth contact A1C5 and the sixth contact A1C6 of the accessory-side first contact group A1CG also respectively constitute the corresponding ground contacts.

Furthermore, Since the seventh contact CC7 to the twelfth contact CC12 of the camera-side contact group CCG respectively constitute the communication contacts, the seventh contact A1C7 to the twelfth contact A1C12 of the accessory-side first contact group A1CG also respectively constitute the corresponding communication contacts.

(B) Accessory-Side Second Contact Group

The accessory-side second mount 204B of the accessory 200 is provided with an accessory-side second contact group A2CG composed of a plurality of contacts A2C1 to A2C12. The accessory-side second contact group A2CG is provided corresponding to the lens-side contact group LCG. Therefore, the accessory-side second contact group A2CG is configured to have the same number of contacts as the contacts constituting the lens-side contact group LCG, and each of the contacts A2C1 to A2C12 is disposed at the same interval as the contacts CC1 to CC12 constituting the lens-side contact group LCG.

In a case where the interchangeable lens 100 is attached to the accessory 200, each of the contacts LC1 to LC12 of the lens-side contact group LCG is connected to the corresponding contacts A2C1 to A2C12 of the accessory-side second contact group A2CG. That is, the first contact LC1 of the lens-side contact group LCG is connected to the first contact A2C1 of the accessory-side second contact group A2CG, the second contact LC2 of the lens-side contact group LCG is connected to the second contact A2C2 of the accessory-side second contact group A2CG, . . . , and the twelfth contact LC12 of the lens-side contact group LCG is connected to the twelfth contact A2C12 of the accessory-side second contact group A2CG.

Since the first contact LC1 of the lens-side contact group LCG constitutes the lens detection contact, the first contact A2C1 of the accessory-side second contact group A2CG also constitutes the lens detection contact.

Further, since the second contact LC2, the third contact LC3, and the fourth contact LC4 of the lens-side contact group LCG respectively constitute the power contacts, the second contact A2C2, the third contact A2C3, and the fourth contact A2C4 of the accessory-side second contact group A2CG also respectively constitute the corresponding power contacts.

The second contact A2C2 is a contact that supplies the lens-drive power LV1 having the lowest voltage, and the fourth contact A2C4 is a contact that supplies the lens-drive power LV3 having the highest voltage. Further, the third contact A2C3 is a contact that supplies the lens-drive power LV2 having the intermediate voltage.

Further, since the fifth contact LC5 and the sixth contact LC6 of the lens-side contact group LCG respectively constitute the ground contacts, the fifth contact A2C5 and the sixth contact A2C6 of the accessory-side second contact group A2CG also respectively constitute the corresponding ground contacts.

Furthermore, since the seventh contact LC7 to the twelfth contact LC12 of the lens-side contact group LCG respectively constitute the communication contacts, the seventh contact A2C7 to the twelfth contact A2C12 of the accessory-side second contact group A2CG also respectively constitute the corresponding communication contacts.

<Relationship between Accessory-Side First Contact Group and Accessory-Side Second Contact Group>

(A) First Contact

The first contact A1C1 constituting the lens detection contact in the accessory-side first contact group A1CG and the first contact A2C1 constituting the lens detection contact in the accessory-side second contact group A2CG are connected to each other by a first connection line AL1 in the accessory. Accordingly, it is possible to electrically connect the first contact CC1 of the camera 10 and the first contact LC1 of the interchangeable lens 100 also in a case where the accessory 200 is attached between the camera 10 and the interchangeable lens 100.

(B) Second Contact to Fourth Contact

The second contact A1C2 constituting the first power contact in the accessory-side first contact group A1CG and the second contact A2C2 constituting the first power contact in the accessory-side second contact group A2CG are connected to each other by a second connection line AL2 constituting an accessory-side power line in the accessory. Accordingly, it is possible to electrically connect the second contact CC2 of the camera 10 and the second contact LC2 of the interchangeable lens 100 also in the case where the accessory 200 is attached between the camera 10 and the interchangeable lens 100. In this case, the second connection line AL2 functions as a line that supplies the first lens-drive power LV1 having the lowest voltage from the camera 10 to the interchangeable lens 100.

The third contact A1C3 constituting the second power contact in the accessory-side first contact group A1CG and the third contact A2C3 constituting the second power contact in the accessory-side second contact group A2CG are connected to each other by a third connection line AL3 constituting the accessory-side power line in the accessory. Accordingly, it is possible to electrically connect the third contact CC3 of the camera 10 and the third contact LC3 of the interchangeable lens 100 also in the case where the accessory 200 is attached between the camera 10 and the interchangeable lens 100. In this case, the third connection line AL3 functions as a line that supplies the second lens-drive power LV2 having the intermediate voltage from the camera 10 to the interchangeable lens 100.

The fourth contact A1C4 constituting the third power contact in the accessory-side first contact group A1CG and the fourth contact A2C4 constituting the third power contact in the accessory-side second contact group A2CG are connected to each other by a fourth connection line AL4 constituting the accessory-side power line in the accessory. Accordingly, it is possible to electrically connect the fourth contact CC4 of the camera 10 and the fourth contact LC4 of the interchangeable lens 100 also in the case where the accessory 200 is attached between the camera 10 and the interchangeable lens 100. In this case, the fourth connection line AL4 functions as a line that supplies the third lens-drive power LV3 having the highest voltage from the camera 10 to the interchangeable lens 100.

(C) Fifth Contact and Sixth Contact

The sixth contact A1C6 constituting a second ground contact in the accessory-side first contact group A1CG and the sixth contact A2C6 constituting the second ground contact in the accessory-side second contact group A2CG are connected to each other by a sixth connection line AL6 constituting an accessory-side ground line in the accessory. Accordingly, it is possible to electrically connect the sixth contact CC6 of the camera 10 and the sixth contact LC6 of the interchangeable lens 100 also in the case where the accessory 200 is attached between the camera 10 and the interchangeable lens 100.

The fifth contact A1C5 constituting a first ground contact in the accessory-side first contact group A1CG and the fifth contact A2C5 constituting the first ground contact in the accessory-side second contact group A2CG are connected to the sixth connection line AL6 respectively through fifth connection lines AL5A and AL5B in the accessory. Accordingly, it is possible to electrically connect the fifth contact CC5 of the camera 10 and the fifth contact LC5 of the interchangeable lens 100 also in the case where the accessory 200 is attached between the camera 10 and the interchangeable lens 100.

(D) Seventh Contact to Twelfth Contact

The seventh contact A1C7 constituting the communication contact in the accessory-side first contact group A1CG and the seventh contact A2C7 constituting the communication contact in the accessory-side second contact group A2CG are connected to each other by a seventh connection line AL7 constituting an accessory-side communication line in the accessory. Accordingly, it is possible to electrically connect the seventh contact CC7 of the camera 10 and the seventh contact LC7 of the interchangeable lens 100 also in the case where the accessory 200 is attached between the camera 10 and the interchangeable lens 100.

An eighth contact A1C8 constituting the communication contact in the accessory-side first contact group A1CG and an eighth contact A2C8 constituting the communication contact in the accessory-side second contact group A2CG are connected to each other by an eighth connection line AL8 constituting an accessory-side communication line in the accessory. Accordingly, it is possible to electrically connect the eighth contact CC8 of the camera 10 and the eighth contact LC8 of the interchangeable lens 100 also in the case where the accessory 200 is attached between the camera 10 and the interchangeable lens 100.

A ninth contact A1C9 constituting the communication contact in the accessory-side first contact group A1CG and a ninth contact A2C9 constituting the communication contact in the accessory-side second contact group A2CG are connected to each other by a ninth connection line AL9 constituting an accessory-side communication line in the accessory. Accordingly, it is possible to electrically connect the ninth contact CC9 of the camera 10 and the ninth contact LC9 of the interchangeable lens 100 also in the case where the accessory 200 is attached between the camera 10 and the interchangeable lens 100.

A tenth contact A1C10 constituting the communication contact in the accessory-side first contact group A1CG and a tenth contact A2C10 constituting the communication contact in the accessory-side second contact group A2CG are connected to each other by a tenth connection line AL10 constituting an accessory-side communication line in the accessory. Accordingly, it is possible to electrically connect the tenth contact CC10 of the camera 10 and the tenth contact LC10 of the interchangeable lens 100 also in the case where the accessory 200 is attached between the camera 10 and the interchangeable lens 100.

An eleventh contact A1C11 constituting the communication contact in the accessory-side first contact group A1CG and an eleventh contact A2C11 constituting the communication contact in the accessory-side second contact group A2CG are connected to each other by an eleventh connection line AL11 constituting an accessory-side communication line in the accessory. Accordingly, it is possible to electrically connect the eleventh contact CC11 of the camera 10 and the eleventh contact CC11 of the interchangeable lens 100 also in the case where the accessory 200 is attached between the camera 10 and the interchangeable lens 100.

Here, since the ninth contact, the tenth contact, and the eleventh contact are the contacts used for the three-line serial communication, the ninth connection line AL9, the tenth connection line AU10, and the eleventh connection line AL11 are used for the three-line serial communication.

The twelfth contact A1C12 constituting the communication contact in the accessory-side first contact group A1CG and the twelfth contact A2C12 constituting the communication contact in the accessory-side second contact group A2CG are connected to an accessory microcomputer 210 in the accessory respectively through twelfth connection lines AL12A and AL12B.

<Accessory Microcomputer>

The accessory microcomputer 210 is an example of an accessory control unit and controls an operation of the accessory 200.

The accessory microcomputer 210 comprises a CPU, a ROM, and a RAM, and executes a prescribed program to provide various functions. The ROM stores various pieces of data and the like required for the control in addition to various programs executed by the CPU.

Figure 12:
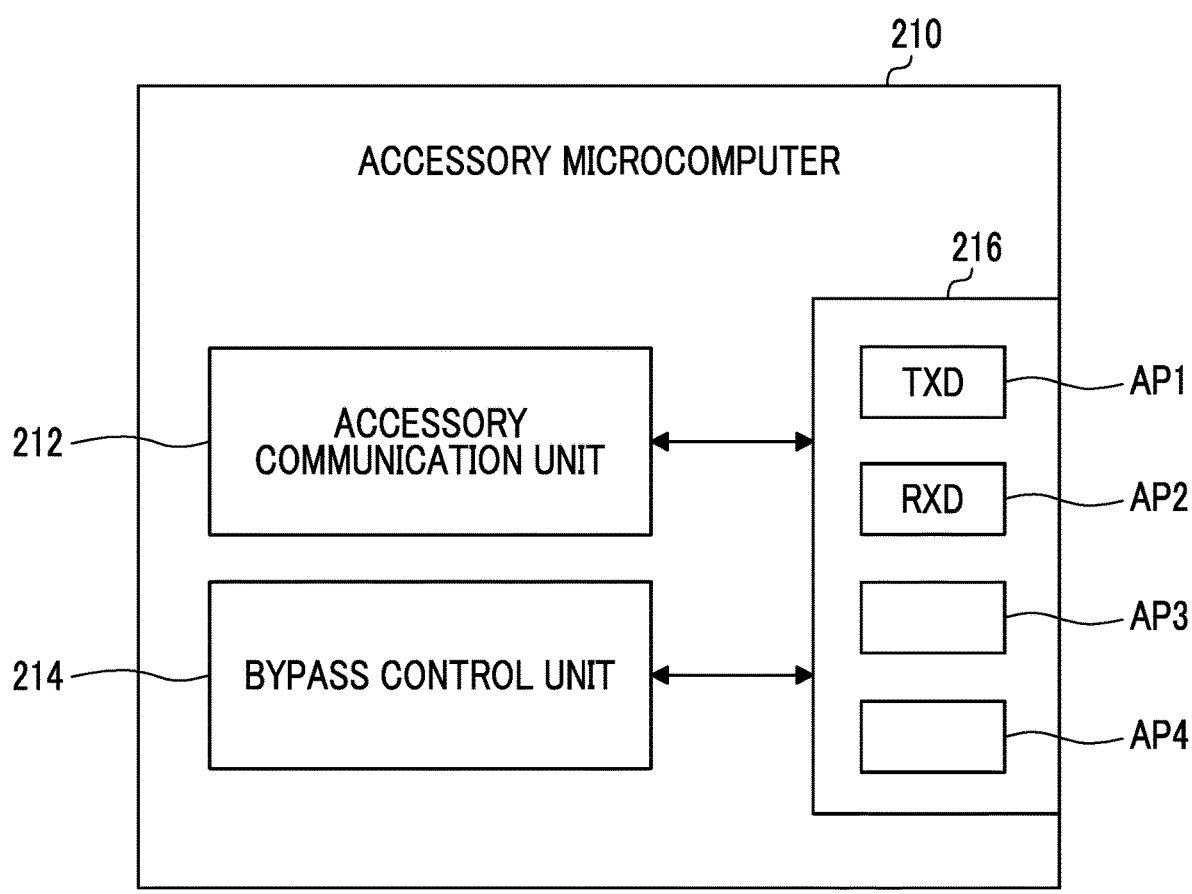
FIG. 12 is a block diagram showing an example of a function realized by an accessory microcomputer.

FIG. 12 is a block diagram showing an example of a function realized by an accessory microcomputer.

As shown in FIG. 12, the accessory microcomputer 210 executes the prescribed program to function as an accessory communication unit 212, a bypass control unit 214, and the like.

The accessory communication unit 212 communicates with the camera 10 and the interchangeable lens 100 to which the accessory 200 is attached. The communication is performed through an accessory microcomputer input and output port 216. The accessory microcomputer input and output port 216 comprises a first port AP1 and a second port AP2 for performing the single-line serial communication between the camera 10 and the interchangeable lens 100. The first port AP1 functions as the TXD port that outputs the data. The first port AP1 is connected to the twelfth contact A1C12 of the accessory-side first contact group A1CG through the twelfth connection line AL12A (refer to FIG. 11). The second port AP2 functions as the RXD port that receives the data. The second port AP2 is connected to the twelfth contact A2C12 of the accessory-side second contact group A2CG through the twelfth connection line AL12B (refer to FIG. 11).

Accordingly, the camera microcomputer 34 is connected to the accessory microcomputer 210 in a communicable manner through the twelfth contact CC12 of the camera-side contact group CCG and the twelfth contact A1C12 of the accessory-side first contact group A1CG. Further, the lens microcomputer 114 is connected to the accessory microcomputer 210 in a communicable manner through the twelfth contact LC12 of the lens-side contact group LCG and the twelfth contact A2C12 of the accessory-side second contact group A2CG.

The bypass control unit 214 is a control unit that controls on and off of a bypass mechanism for the camera microcomputer 34 and the lens microcomputer 114 to communicate without passing through the accessory microcomputer 210. The bypass mechanism is composed as follows.

<Bypass Mechanism>

(A) Configuration of Bypass Mechanism

As shown in FIG. 11, a bypass line 232 is connected between the twelfth contact A1C12 of the accessory-side first contact group A1CG and the twelfth contact A2C12 of the accessory-side second contact group A2CG so as to bypass the accessory microcomputer 210.

A first field-effect transistor (FET) 234 as a first switch and a second FET 236 as a second switch are connected to the bypass line 232.

A source contact of the first FET 234 is connected to the twelfth contact A1C12 of the accessory-side first contact group A1CG through the bypass line 232. Further, a drain contact of the first FET 234 is connected to a drain contact of the second FET 236 through the bypass line 232.

Further, a source contact of the second FET 236 is connected to the twelfth contact A2C12 of the accessory-side second contact group A2CG through the bypass line 232.

Gate contacts of the first FET 234 and the second FET 236 are respectively connected to a line 238 that connects the second connection line AL2 and the sixth connection line AL6.

The third FET 240 as a third switch and a pull-up resistor 242 are connected to the line 238.

As described above, since the second connection line AL2 functions as the line that supplies the first lens-drive power LV1 having the lowest voltage, the gate contacts of the first FET 234 and the second FET 236 connected to the line 238 are respectively pulled up to potential of the first lens-drive power LV1.

A drain contact of the third FET 240 is connected to the pull-up resistor 242 through the line 238. Further, a source contact of the third FET 240 is connected to the sixth connection line AL6 through the line 238. Since the sixth connection line AL6 functions as the ground line, the source contact of the third FET 240 is grounded.

Further, the gate contact of the third FET 240 is connected to the third port AP3 of the accessory microcomputer 210 through the line 244. The accessory microcomputer 210 functioning as the bypass control unit 214 controls the polarity (HIGH level or LOW level) of the third port AP3 to control the on and off of the bypass mechanism.

(B) Operation of Bypass Mechanism

In the case where the accessory 200 is attached, a mode in which the camera microcomputer 34 and the lens microcomputer 114 communicate with passing through the accessory microcomputer 210 is set as a normal communication mode, and a mode in which the camera microcomputer 34 and the lens microcomputer 114 communicate without passing through the accessory microcomputer 210 is set as the bypass mode. The bypass mechanism is turned off in the normal communication mode, and the bypass mechanism is turned on in the bypass mode.

(1) Normal Communication Mode

The bypass mechanism is turned off in the normal communication mode. In this case, the accessory microcomputer 210 sets the polarity of the third port AP3 of the accessory microcomputer input and output port 216 thereof to the HIGH level. Accordingly, the gate contact of the third FET 240 is set to the HIGH level, and the third FET 240 as the switch is turned on.

On the other hand, the third FET 240 as the switch is turned on to respectively set the gate contacts of the first FET 234 and the second FET 236 to the LOW level. Accordingly, the first FET 234 and the second FET 236 as the switch are turned off. As a result, the bypass line 232 is disconnected, and the bypass mechanism is turned off.

Accordingly, the camera microcomputer 34 and the lens microcomputer 114 are communicable through the accessory microcomputer 210. More specifically, the accessory microcomputer 210 and the camera microcomputer 34 are connected in a communicable manner, and the accessory microcomputer 210 and the lens microcomputer 114 are connected in a communicable manner.

The communication herein is the single-line serial communication. In this case, the data is transmitted from the lens microcomputer 114 to the accessory microcomputer 210, and the data is transmitted from the accessory microcomputer 210 to the camera microcomputer 34.

(2) Bypass Mode

The bypass mechanism is turned on in the bypass mode. In this case, the accessory microcomputer 210 sets the polarity of the third port AP3 of the accessory microcomputer input and output port 216 thereof to the LOW level. Accordingly, the third FET 240 as the switch is turned off.

On the other hand, in the case where the third FET 240 as the switch is turned off, the gate contacts of the first FET 234 and the second FET 236 are respectively set to the HIGH level. Accordingly, the first FET 234 and the second FET 236 as the switch are turned on. As a result, the bypass line 232 is conductive, and the bypass mechanism is turned on.

Accordingly, the setting is made that the camera microcomputer 34 and the lens microcomputer 114 can directly communicate without passing through the accessory microcomputer 210.

<Accessory-Side System Power Generation Unit>

A system power for operating the accessory microcomputer 210 is generated by an accessory-side system power generation unit 250 provided in the accessory. The accessory-side system power generation unit 250 generates the system power of the accessory microcomputer 210 using the lens-drive power to be supplied from the camera 10 similarly to the lens-side system power generation unit 112 provided in the interchangeable lens 100.

Here, the accessory microcomputer 210 is configured to operate at a voltage lower than each drive unit constituting the lens drive unit 110 provided in the interchangeable lens 100. For example, the accessory microcomputer 210 is configured to operate at +3.3 V.

The accessory-side system power generation unit 250 generates the system power (+3.3 V) of the accessory microcomputer 210 using the lens-drive power LV1 (+5 V) having the lowest voltage among the plurality of pieces of lens-drive power LV1 to LV3 to be supplied from the camera 10. Therefore, the accessory-side system power generation unit 250 is connected to a second connection line AL2 connected to a second contact which is the power contact.

The accessory-side system power generation unit 250 generates the system power by the voltage drop caused by the resistor similarly to the lens-side system power generation unit 112. Accordingly, it is possible to prevent the occurrence of the noise accompanied by the generation of the system power. The accessory-side system power generation unit 250 is composed of, for example, the LDO regulator.

<Another Configuration>

The twelfth contact A1C12 of the accessory-side first contact group A1CG is grounded through a pull-down resistor AR12 and is pulled down to the ground potential. Accordingly, in the case where the accessory 200 is attached to the camera 10, the twelfth contact CC12 of the camera 10 is set to the LOW level. The camera microcomputer 34 can detect that the accessory 200 is attached to the camera 10 by detecting that the twelfth contact CC12 is at the LOW level.

The pull-down resistor AR12 to be connected to the twelfth contact A1C12 of the accessory-side first contact group A1CG has a resistance value larger than a pull-up resistor LR12 connected to the twelfth contact LC12 of the interchangeable lens 100. For example, the pull-up resistor LR12 connected to the twelfth contact LC12 of the interchangeable lens 100 is configured to be 2.2 kQ, and the pull-down resistor AR12 connected to the twelfth contact A1C12 of the accessory-side first contact group A1CG is configured to be 220 kΩ. Accordingly, for example, even in a case where a mode of the accessory 200 is set to the bypass mode, it is possible to set the twelfth contact CC12 of the camera 10 to the LOW level (second polarity).

Further, the accessory microcomputer input and output port 216 of the accessory microcomputer 210 comprises a fourth port AP4. The fourth port AP4 functions as a communication port for input and is connected to the seventh connection line AL7 through a line 260. Accordingly, the accessory microcomputer 210 can receive the information to be transmitted through the seventh connection line AL7.

[Action of Camera System]

Figure 13:
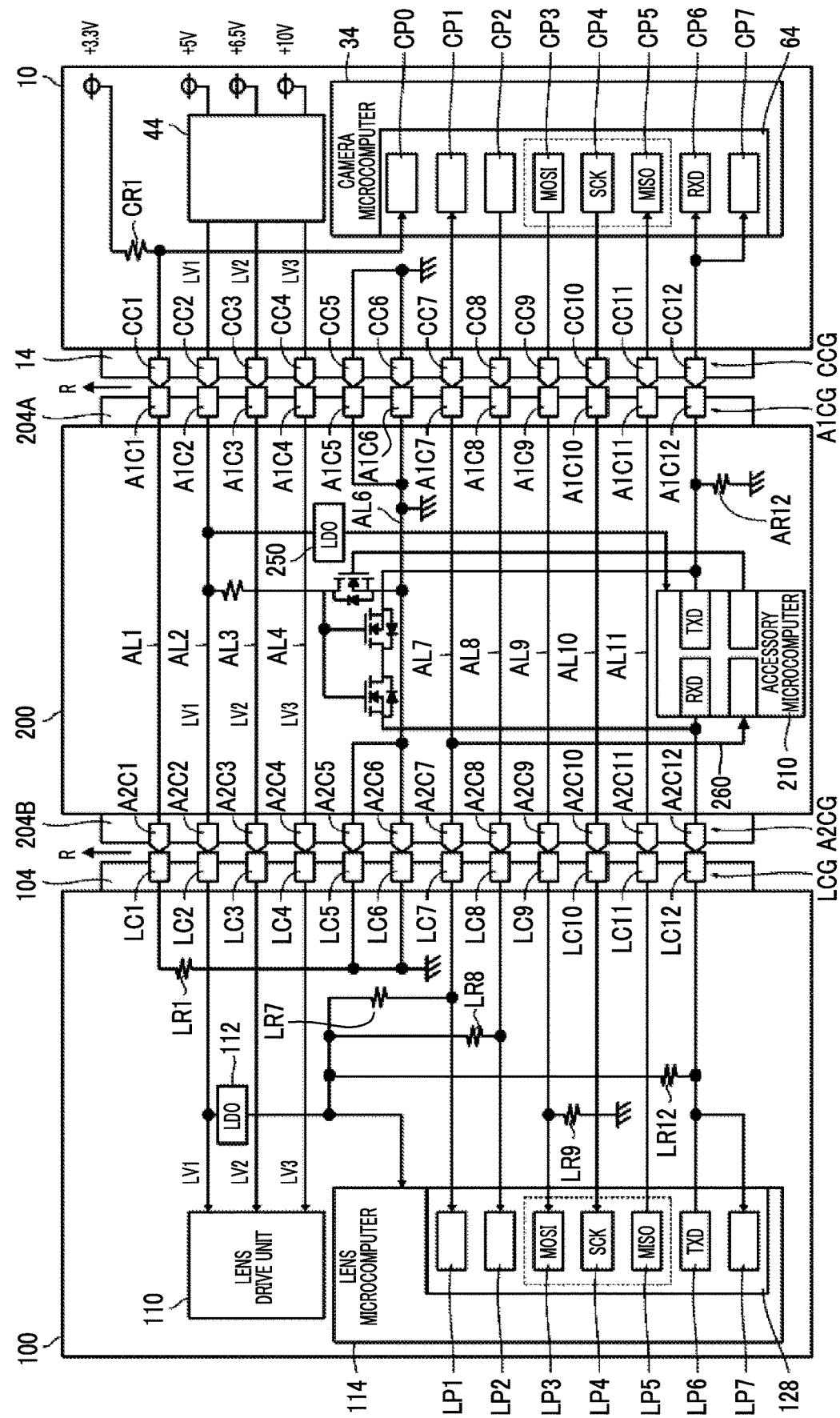
FIG. 13 is a diagram showing a mutual electric connection in a case where the accessory is attached between the camera and the interchangeable lens.

FIG. 13 is a diagram showing a mutual electric connection in a case where the accessory is attached between the camera and the interchangeable lens.

<<Attachment of Accessory>>

The accessory-side first mount 204A provided in the accessory 200 is attached to the camera-side mount 14 provided in the camera 10 to attach the accessory 200 to the camera 10. In this case, the accessory 200 is rotated with respect to the camera 10 for the attachment.

Further, the lens-side mount 104 provided in the interchangeable lens 100 is attached to the accessory-side second mount 204B provided in the accessory 200 to attach the interchangeable lens 100 to the accessory 200. In this case, the interchangeable lens 100 is rotated with respect to the accessory 200 for the attachment.

Accordingly, the accessory 200 is attached between the interchangeable lens 100 and the camera 10. The lens-side contact group LCG of the interchangeable lens 100 is connected to the accessory-side second contact group A2CG of the accessory 200 due to the attachment of the accessory 200 therebetween. Further, the camera-side contact group CCG of the camera 10 is connected to the accessory-side first contact group A1CG of the accessory 200.

<<Electric Connection between Camera and Interchangeable Lens>>

(A) First Contact

The first contact CC1 of the camera 10 which is the lens detection contact is electrically connected to the first contact LC1 of the interchangeable lens 100 through the first connection line AL1 of the accessory 200 due to the attachment of the accessory 200 therebetween. Accordingly, the attachment of the interchangeable lens 100 can be detected in the camera 10.

(B) Second Contact to Fourth Contact

The second contact CC2 of the camera 10 which is the first power contact is electrically connected to the second contact LC2 of the interchangeable lens 100 through the second connection line AL2 of the accessory 200 due to the attachment of the accessory 200 therebetween. Further, the third contact CC3 of the camera 10 which is the second power contact is electrically connected to the third contact LC3 of the interchangeable lens 100 through the third connection line AL3 of the accessory 200. Further, the fourth contact CC4 of the camera 10 which is the third power contact is electrically connected to the fourth contact LC4 of the interchangeable lens 100 through the fourth connection line AL4 of the accessory 200.

Accordingly, it is possible to supply the pieces of lens-drive power LV1, LV2, and LV3 from the camera 10 to the interchangeable lens 100.

(C) Fifth Contact and Sixth Contact

The fifth contact CC5 and the sixth contact CC6 of the camera 10 which are the ground contacts are electrically connected to the fifth contact LC5 and the sixth contact LC6 of the interchangeable lens 100 through the fifth connection lines AL5A and AL5B and the sixth connection line AL6 of the accessory 200 due to the attachment of the accessory 200 therebetween.

(D) Seventh Contact to Twelfth Contact

The seventh contact CC7 to the eleventh contact CC11 of the camera 10 which are the communication contacts are electrically connected to the seventh contact LC7 to the eleventh contact LC11 of the interchangeable lens 100 through the seventh connection line AL7 to the eleventh connection line AL11 of the accessory 200 due to the attachment of the accessory 200 therebetween. Accordingly, the three-line serial communication or the like is possible between the camera 10 and the interchangeable lens 100.

Further, the twelfth contact CC12 of the camera 10 which is the communication contact is electrically connected to the accessory microcomputer 210 through the twelfth connection line AL12A of the accessory 200 due to the attachment of the accessory 200 therebetween. Further, the twelfth contact LC12 of the interchangeable lens 100 which is the communication contact is electrically connected to the accessory microcomputer 210 through the twelfth connection line AL12B of the accessory 200. Accordingly, the communication is possible between the camera microcomputer 34 and the accessory microcomputer 210, and between the lens microcomputer 114 and the accessory microcomputer 210.

<<Detection of Accessory Attachment>>

As described above, the camera microcomputer 34 can detect the presence or absence of the attachment of the accessory 200 by discriminating the polarity of the twelfth contact CC12.

As described above, in the case where the accessory 200 is attached to the camera 10, the twelfth contact CC12 of the camera 10 is set to the LOW level. The camera microcomputer 34 determines that the accessory 200 is attached to the camera 10 by detecting that the twelfth contact CC12 is at the LOW level.

<<Activation of Accessory Microcomputer>>

In a case where the pieces of lens-drive power LV1, LV2, and LV3 are supplied from the camera 10 to the interchangeable lens 100, a part of the pieces of power is supplied to the accessory-side system power generation unit 250. Specifically, the first lens-drive power LV1 (+5 V) having the lowest voltage is supplied to the accessory-side system power generation unit 250. The accessory-side system power generation unit 250 generates the system power (+3.3 V) of the accessory microcomputer 210 using the supplied lens-drive power LV1 and supplies the generated system power to the accessory microcomputer 210. Accordingly, the accessory microcomputer 210 is activated.

<<Acquisition of Accessory Information>>

In the case where the accessory 200 is attached, accessory information on the attached accessory 200 is transmitted to the camera. The accessory information refers to information indicating a specification of the accessory 200. The accessory information includes, for example, accessory model data, accessory attachment position data, optical correction data, and the like. The accessory model data includes, for example, an accessory model name, an accessory type, a maker name, and the like. The accessory attachment position data includes data on a valid attachment position of the accessory, data on the number of attachments, and the like. The optical correction data includes correction data of an image in the case where the accessory is attached and the like. The accessory information is stored in the ROM of the accessory microcomputer 210.

In the case where the lens information is transmitted from the interchangeable lens 100 to the camera 10, the accessory information is added to the lens information and the added information is transmitted to the camera 10.

As described above, the lens information is transmitted from the interchangeable lens 100 to the camera 10 through the twelfth contact LC12 of the interchangeable lens 100 and the twelfth contact CC12 of the camera 10.

In the case where the accessory 200 is attached, the lens information output from the twelfth contact LC12 of the interchangeable lens 100 is received by the accessory microcomputer 210 through the twelfth contact A2C12 of the accessory-side second contact group A2CG of the accessory 200.

In a case where the lens information is received from the interchangeable lens 100, the accessory microcomputer 210 adds own accessory information to the lens information and transmits the information to the camera 10. The transmitted information (lens information+accessory information) is output from the twelfth contact A1C12 of the accessory-side first contact group A1CG of the accessory 200 and is received by the camera microcomputer 34 through the twelfth contact CC12 of the camera 10.

Accordingly, the camera 10 can acquire the pieces of information on the attached accessory 200 and the interchangeable lens 100 at the same time.

As described above, in the case where the transmission and reception of the lens information are completed, the twelfth contact CC12 of the camera-side contact group CCG and the twelfth contact LC12 of the lens-side contact group LCG are switched to the function as the contacts for notifying the camera 10 of the state from the interchangeable lens 100. In this case, the accessory is switched to the bypass mode.

Another Embodiment

[Enhancement of Lens-Drive Power]

The power supply unit 42 may comprise a function of enhancing a supplying capacity of specific power (supplying capacity enhancement function) so as to be able to enhance the supplying capacity of the lens-drive power. In this case, the power supply unit 42 enhances the supplying capacity of the lens-drive power having the highest voltage among the plurality of pieces of lens-drive power to be supplied.

It may be adopted a form of increasing the voltage to be supplied and/or a form of increasing a current amount to be supplied as a form for enhancing the supplying capacity.

The camera microcomputer 34 enhances the supplying capacity of the lens-drive power having the highest voltage as necessary. For example, in a case where an interchangeable lens whose drive performance is improved by enhancing the supplying capacity of the lens-drive power is attached, the supplying capacity of the lens-drive power having the highest voltage is enhanced.

Whether a lens is the interchangeable lens whose drive performance is improved by enhancing the supplying capacity of the lens-drive power is different for each interchangeable lens. Information on the interchangeable lens whose drive performance is improved by enhancing the supplying capacity of the lens-drive power is stored in the ROM of the lens microcomputer 114 and is transmitted to the camera 10 including the lens information.

The camera microcomputer 34 determines whether an attached interchangeable lens is the interchangeable lens whose drive performance is improved by enhancing the supplying capacity of the lens-drive power based on the acquired lens information. That is, it is discriminated whether the supplying of the lens-drive power with enhanced supplying capacity is necessary. In a case where it is discriminated that the supplying of the lens-drive power with enhanced supplying capacity is necessary, the supplying capacity enhancement function of the power supply unit 42 is operated. Accordingly, the lens-drive power with enhanced supplying capacity is supplied from the power supply unit 42. In this case, as described above, the supplying capacity of the lens-drive power having the highest voltage is enhanced and supplied.

In this manner, it is possible to appropriately supply the power required for each interchangeable lens by enhancing the supplying capacity of the lens-drive power as necessary. Further, accordingly, it is possible to achieve high performance of the interchangeable lens.

[Configuration of Camera System]

The camera system can be composed of at least one camera and at least one interchangeable lens and can include at least one accessory.

The camera is composed of the digital camera in the embodiment described above, but the invention may also be employed for a so-called silver salt camera.

The invention can prevent the generation of the noise on the interchangeable lens side. Therefore, the invention effectively acts particularly in the case where the invention is employed in the digital camera, particularly in the non-reflex digital camera. In the non-reflex digital camera, there is large influence of the noise received from the interchangeable lens on an interval between the image sensor and the interchangeable lens compared with a reflex digital camera such as a single-lens reflex camera.

The interchangeable lens provided with the AF function, the camera shake correction function, and the stop is described as an example of the interchangeable lens in the embodiment described above, the function provided in the interchangeable lens is not limited thereto. In addition, for example, an electric zoom function and the like may be provided. In an interchangeable lens provided with the electric zoom function, a zoom drive unit that drives a zoom lens which is an optical member for zoom is provided.

As described above, a known accessory such as the extender or the extension tube the accessory may be adopted as the accessory. In a case where the accessory is provided with the drive unit, the drive unit is driven by using the lens-drive power similarly to the case of the interchangeable lens.

[Type of Lens-Drive Power]

A type of the lens-drive power to be supplied from the camera to the interchangeable lens is set as appropriate depending on an interchangeable lens constituting the camera system. For example, in a case where one of the interchangeable lenses constituting the camera system comprises four optical member drive units (for example, focus drive unit, camera shake correction mechanism drive unit, stop drive unit, and zoom drive unit) and each optical member drive unit operates at a different operation voltage, four types of the lens-drive power are supplied from the camera. In this case, four contacts as the power contacts are provided in the camera-side contact group and the lens-side contact group.

[Ground Contact]

The two ground contacts are provided in the embodiment described above, but one ground contact may be provided. As in the camera system of the embodiment described above, it is possible to more stably supply the power by comprising the plurality of ground contacts.

The independent two ground contacts are provided in the embodiment described above, the two ground contacts may be connected to each other. Accordingly, it is possible to enlarge the area of the contact and thus to more stably supply the power.

[Detection of Normal Supplying of System Power to Lens Microcomputer]

In the embodiment described above, the polarities of the specific contacts are discriminated and the normal supplying of the system power to the lens microcomputer is detected. However, at least one contact for discriminating the polarity may be used. That is, at least one contact may be pulled up to the potential of the system power through the pull-up resistor on the interchangeable lens side. In this case, at least one contact excluding the power contact and the ground contact is used as the contact for detection.

As in the camera system 1 of the embodiment described above, it is possible to more accurately detect that the system power is normally supplied to the lens microcomputer by discriminating the polarities of the plurality of contacts.

[Configuration of Performing Various Pieces of Processing]

The camera control unit performing the various pieces of processing is composed of the microcomputer (camera microcomputer) in the embodiment described above, but a hardware configuration for performing the various pieces of processing is not limited thereto. The hardware configuration may be composed of various processors. The various processors include a CPU which is a general processor functioning as a processing unit that performs various pieces of processing by executing software (program), a programmable logic device (PLD) which is a processor whose circuit configuration can be changed after manufacturing such as a field programmable gate array (FPGA), an exclusive electric circuit which is a processor having a circuit configuration that is exclusively designed for executing specific processing such as an application specific integrated circuit (ASIC), and the like.

One processing unit may be composed of one of these various processors or may be composed of two processors or more having the same type or different types. For example, one processing unit may be composed of a plurality of FPGAs or may be composed of a combination of the CPU and the FPGA.

Further, a plurality of processing units may be configured as one processor. A first example of constituting the plurality of processing units as one processor is a form in which one processor is composed of a combination of one or more CPUs, as represented by computers such as a client and a server, and software, and this processor functions as the plurality of processing units. A second example thereof is a form in which a processor, as represented by a system on chip (SoC) or the like, that realizes the functions of the entire system including the plurality of processing units by one integrated circuit (IC) chip is used. In this manner, the various processing units are composed by using one or more processors of the various processors described above as the hardware configuration.

Furthermore, more specifically, the hardware configuration of these various processors is an electric circuit that combines circuit elements such as semiconductor elements.

EXPLANATION OF REFERENCES

1: camera system
10: camera
12: camera body
14: camera-side mount
16: image sensor
18: shutter
20: image sensor drive unit
22: shutter drive unit
24: analog signal processing section
26: display unit
28: image data storage unit
30: camera operation unit
32: power source unit
34: camera microcomputer
40: battery
42: power supply unit
44: lens-drive power switch unit
50: digital signal processing section
52: display control unit
54: recording control unit
56: power control unit
58: lens-drive power switch control unit
60: lens attachment detection unit
62: camera communication unit
64: camera microcomputer input and output port
100: interchangeable lens
102: lens barrel
104: lens-side mount
106A: focus lens
106B: camera shake correction lens
106C: stop
110: lens drive unit
110A: focus drive unit
110B: camera shake correction mechanism drive unit
110C: stop drive unit
112: lens-side system power generation unit
114: lens microcomputer
120: focus drive control unit
122: camera shake correction mechanism drive control unit
124: stop drive control unit
126: lens communication unit
128: lens microcomputer input and output port
200: accessory
202: barrel
204A: accessory-side first mount
204B: accessory-side second mount
210: accessory microcomputer
212: accessory communication unit
214: bypass control unit
216: accessory microcomputer input and output port
232: bypass line
234: first FET
236: second FET
238: line
240: third FET
242: pull-up resistor
244: line
250: accessory-side system power generation unit
260: line
LV1 to LV3: lens-drive power
LV1: first lens-drive power
LV2: second lens-drive power
LV3: third lens-drive power
CCG: camera-side contact group
CC1 to CC12: contact
CC1: first contact
CC2: second contact
CC3: third contact
CC4: fourth contact
CC5: fifth contact
CC6: sixth contact CC7: seventh contact
CC8: eighth contact
CC9: ninth contact
CC10: tenth contact
CC11: eleventh contact
CC12: twelfth contact
LCG: lens-side contact group
LC1 to LC12: contact
LC1: first contact
LC2: second contact
LC3: third contact
LC4: fourth contact
LC5: fifth contact
LC6: sixth contact
LC7: seventh contact
LC8: eighth contact
LC9: ninth contact
LC10: tenth contact
LC11: eleventh contact
LC12: twelfth contact
A1CG: accessory-side first contact group
A1C1 to A1C2: contact
A1C1: first contact
A1C2: second contact
A1C3: third contact
A1C4: fourth contact
A1C5: fifth contact
A1C6: sixth contact
A1C7: seventh contact
A1C8: eighth contact
A1C9: ninth contact
A1C10: tenth contact
A1C11: eleventh contact
A1C12: twelfth contact
A2CG: accessory-side second contact group
A2C1 to A2C12: contact
A2C1: first contact
A2C2: second contact
A2C3: third contact
A2C4: fourth contact
A2C5: fifth contact
A2C6: sixth contact
A2C7: seventh contact
A2C8: eighth contact
A2C9: ninth contact
A2C10: tenth contact
A2C11: eleventh contact
A2C12: twelfth contact
CP0 to CP7: camera microcomputer input and output port
CP0: lens detection port
CP1: first communication port
CP2: second communication port
CP3: third communication port
CP4: fourth communication port
CP5: fifth communication port
CP6: sixth communication port
CP7: seventh communication port
LP1 to LP7: lens microcomputer input and output port
LP1: first communication port
LP2: second communication port
LP3: third communication port
LP4: fourth communication port
LP5: fifth communication port
LP6: sixth communication port
LP7: seventh communication port
AP1 to AP4: accessory microcomputer input and output port
AP1: first port
AP2: second port
AP3: third port
AP4: fourth port
AL1 to AL12: connection line
AL1: first connection line
AL2: second connection line
AL3: third connection line
AL4: fourth connection line
AL5A: fifth connection line
AL5B: fifth connection line
AL6: sixth connection line
AL7: seventh connection line
AL8: eighth connection line
AL9: ninth connection line
AL10: tenth connection line
AL11: eleventh connection line
AL12A: twelfth connection line
AL12B: twelfth connection line
AR12: pull-down resistor
CR1: pull-up resistor
LR1: pull-down resistor
LR12: pull-up resistor
LR7: pull-up resistor
LR8: pull-up resistor
LR9: pull-down resistor
R: rotation direction of interchangeable lens in case where interchangeable lens is attached to camera

What is claimed is:

1. A lens-interchangeable camera system comprising:
a camera; and
an interchangeable lens to be attachably and detachably attached to the camera,
wherein the camera comprises
a camera-side mount,
a camera-side contact group that is composed of a plurality of contacts including a plurality of power contacts, ground contacts, and communication contacts, and is provided in the camera-side mount,
a power supply unit that supplies pieces of lens-drive power respectively having different voltages to the plurality of power contacts of the camera-side contact group, and
a camera control unit, and
wherein the interchangeable lens comprises
a lens-side mount to be attachably and detachably attached to the camera-side mount,
a lens-side contact group provided in the lens-side mount to correspond to the camera-side contact group,
a plurality of optical member drive units that drive a plurality of optical members constituting the interchangeable lens by a plurality of pieces of lens-drive power to be input from the plurality of power contacts of the lens-side contact group,
a lens control unit that is operated at a voltage lower than that of the plurality of optical member drive units, and
a lens-side system power generation unit that generates system power to be supplied to the lens control unit by using lens-drive power having the lowest voltage among the plurality of pieces of lens-drive power to be input from the plurality of power contacts of the lens-side contact group,
wherein the interchangeable lens includes the plurality of optical member drive units which are operated at operation voltages corresponding to the respective voltages of the pieces of lens-drive power input from the plurality of power contacts of the lens-side contact group.

2. The camera system according to claim 1,
wherein the lens-side system power generation unit generates system power by a voltage drop caused by a resistor.

3. The camera system according to claim 1,
wherein the lens-side mount is rotated to be attached to the camera-side mount, and
wherein in the camera-side contact group and the lens-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

4. The camera system according to claim 1,
wherein the lens-side mount is rotated to be attached to the camera-side mount,
wherein the camera-side contact group and the lens-side contact group further respectively include a lens detection contact, and
wherein the lens detection contact is disposed at a head in a rotation direction in the case where the lens-side mount is attached to the camera-side mount.

5. The camera system according to claim 4,
wherein the camera-side contact group and the lens-side contact group are disposed in an order of the lens detection contact as the head and other contacts including the plurality of power contacts, ground contacts, and communication contacts with respect to the rotation direction in the case where the lens-side mount is attached to the camera-side mount.

6. The camera system according to claim 1,
wherein the power supply unit has a supplying capacity enhancement function for enhancing supplying capacity of lens-drive power having the highest voltage among the plurality of pieces of lens-drive power, and
wherein in the case where the interchangeable lens is attached, the camera control unit communicates with the lens control unit to acquire the lens information on the interchangeable lens attached to the camera from the lens control unit, discriminates whether lens-drive power with enhanced supplying capacity is necessary based on the acquired lens information, and operates the supplying capacity enhancement function of the power supply unit in a case where it is discriminated that the lens-drive power with enhanced supplying capacity is necessary.

7. The camera system according to claim 6,
wherein the supplying capacity enhancement function is a function of increasing a voltage of the lens-drive power having the highest voltage among the plurality of pieces of lens-drive power or a function of increasing a current amount of the lens-drive power having the highest voltage among the plurality of pieces of lens-drive power.

8. The camera system according to claim 1,
wherein a pull-up resistor that pulls a contact up to potential of the system power generated by the lens-side system power generation unit is connected to at least one contact excluding the power contact and the ground contact among the plurality of contacts constituting the lens-side contact group, and
wherein the camera control unit discriminates a polarity of a contact of the camera-side contact group to be connected to the contact of the lens-side contact group to which the pull-up resistor is connected to discriminate presence or absence of supplying of the system power to the lens control unit.

9. The camera system according to claim 8,
wherein a pull-down resistor that pulls a contact down to potential of the ground is connected to at least one contact excluding the power contact, the ground contact, and the contact of the lens-side contact group to which the pull-up resistor is connected among the plurality of contacts constituting the lens-side contact group, and
wherein the camera control unit discriminates the polarity of the contact of the camera-side contact group to be connected to the contact of the lens-side contact group to which the pull-up resistor is connected and a polarity of a contact of the camera-side contact group to be connected to the contact of the lens-side contact group to which the pull-down resistor is connected to discriminate whether a regular interchangeable lens is attached.

10. The camera system according to claim 1,
wherein the camera-side contact group and the lens-side contact group comprise a plurality of ground contacts.

11. The camera system according to claim 1, further comprising:
an accessory to be attachably and detachably attached between the camera and the interchangeable lens,
wherein the accessory comprises
an accessory-side first mount to be attachably and detachably attached to the camera-side mount,
an accessory-side second mount to be attachably and detachably attached to the lens-side mount,
an accessory-side first contact group provided in the accessory-side first mount to correspond to the camera-side contact group,
an accessory-side second contact group provided in the accessory-side second mount to correspond to the lens-side contact group,
a plurality of accessory-side power lines that connect the plurality of power contacts of the accessory-side first contact group and the plurality of power contacts of the accessory-side second contact group,
a plurality of accessory-side ground lines that connect a ground contact of the accessory-side first contact group and a ground contact of the accessory-side second contact group,
a plurality of accessory-side communication lines that connect a communication contact of the accessory-side first contact group and a communication contact of the accessory-side second contact group,
an accessory control unit that is operated at a voltage lower than that of the plurality of optical member drive units, and
an accessory-side system power generation unit that generates system power to be supplied to the accessory control unit using lens-drive power having the lowest voltage among the plurality of pieces of lens-drive power to be supplied through the plurality of accessory-side power lines.

12. A lens-interchangeable camera system comprising:
a camera; and
an interchangeable lens to be attachably and detachably attached to the camera,
wherein the camera comprises
a camera-side mount,
a camera-side contact group that is composed of a plurality of contacts including a plurality of power contacts, ground contacts, and communication contacts, and is provided in the camera-side mount,
a power supply unit that supplies pieces of lens-drive power respectively having different voltages to the plurality of power contacts of the camera-side contact group, and
a camera control unit, and
wherein the interchangeable lens comprises
a lens-side mount to be attachably and detachably attached to the camera-side mount,
a lens-side contact group provided in the lens-side mount to correspond to the camera-side contact group,
at least one optical member drive unit that drives at least one optical member constituting the interchangeable lens by a plurality of pieces of lens-drive power to be input from the plurality of power contacts of the lens-side contact group,
a lens control unit that is operated at a voltage lower than that of the optical member drive unit, and
a lens-side system power generation unit that generates system power to be supplied to the lens control unit by using lens-drive power having the lowest voltage among the plurality of pieces of lens-drive power to be input from the plurality of power contacts of the lens-side contact group,
wherein the camera further comprises a lens-drive power switch unit that individually turns on and off supplying of lens-drive power to be supplied to the plurality of power contacts of the camera-side contact group from the power supply unit, and
wherein in a case where the interchangeable lens is attached, the camera control unit communicates with the lens control unit to acquire lens information on the interchangeable lens attached to the camera from the lens control unit, discriminates lens-drive power required for the interchangeable lens attached to the camera based on the acquired lens information, and controls the lens-drive power switch unit based on a discriminated result to supply only the lens-drive power required for the interchangeable lens.

13. An interchangeable lens to be attachably and detachably attached to a camera comprising a camera-side mount, a camera-side contact group that is composed of a plurality of contacts including a plurality of power contacts, ground contacts, and communication contacts, and is provided in the camera-side mount, and a power supply unit that supplies pieces of lens-drive power respectively having different voltages to the plurality of power contacts of the camera-side contact group, the interchangeable lens comprising:
a lens-side mount to be attachably and detachably attached to the camera-side mount;
a lens-side contact group provided in the lens-side mount to correspond to the camera-side contact group;
a plurality of optical member drive units that drives a plurality of optical members constituting the interchangeable lens by a plurality of pieces of lens-drive power to be input from the plurality of power contacts of the lens-side contact group;
a lens control unit that is operated at a voltage lower than that of the plurality of optical member drive units; and
a lens-side system power generation unit that generates system power to be supplied to the lens control unit by using lens-drive power having the lowest voltage among the plurality of pieces of lens-drive power to be input from the plurality of power contacts of the lens-side contact group,
wherein the interchangeable lens includes the plurality of optical member drive units which are operated at operation voltages corresponding to the respective voltages of the pieces of lens-drive power input from the plurality of power contacts of the lens-side contact group.

14. The interchangeable lens according to claim 13,
wherein the lens-side system power generation unit generates system power by a voltage drop caused by a resistor.

15. The interchangeable lens according to claim 13,
wherein the lens-side mount is rotated to be attached to the camera-side mount, and
wherein in the lens-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

16. The interchangeable lens according to claim 13,
wherein the lens-side mount is rotated to be attached to the camera-side mount,
wherein the lens-side contact group further includes a lens detection contact, and
wherein the lens detection contact is disposed at a head in a rotation direction in the case where the lens-side mount is attached to the camera-side mount.

17. The interchangeable lens according to claim 16,
wherein the lens-side contact group is disposed in an order of the lens detection contact as the head and other contacts including the plurality of power contacts, ground contacts, and communication contacts with respect to the rotation direction in the case where the lens-side mount is attached to the camera-side mount.

18. A camera to which an interchangeable lens is attachably and detachably attached, the camera comprising:
a camera-side mount to which a lens-side mount provided in the interchangeable lens is attachably and detachably attached;
a camera-side contact group that is composed of a plurality of contacts including a plurality of power contacts, ground contacts, and communication contacts, and is provided in the camera-side mount;
a power supply unit that supplies pieces of lens-drive power respectively having different voltages to the plurality of power contacts of the camera-side contact group, in which a voltage of lens-drive power having the lowest voltage among a plurality of pieces of lens-drive power is higher than a voltage of system power of the interchangeable lens;
a camera control unit; and
a lens-drive power switch unit that individually turns on and off supplying of lens-drive power to be supplied to the plurality of power contacts of the camera-side contact group from the power supply unit, wherein in a case where the interchangeable lens is attached, the camera control unit communicates with the lens control unit provided in the interchangeable lens to acquire lens information on the interchangeable lens attached to the camera from the lens control unit, discriminates lens-drive power required for the interchangeable lens attached to the camera based on the acquired lens information, and controls the lens-drive power switch unit based on a discriminated result to supply only the lens-drive power required for the interchangeable lens.

19. The camera according to claim 18,
wherein the lens-side mount is rotated to be attached to the camera-side mount, and
wherein in the camera-side contact group, the plurality of power contacts and ground contacts are disposed adjacent to each other, the ground contacts are disposed on a front side of the plurality of power contacts with respect to a rotation direction in a case where the lens-side mount is attached to the camera-side mount, and the power contacts are disposed in an ascending order of the voltage from the front side with respect to the rotation direction in the case where the lens-side mount is attached to the camera-side mount.

20. The camera according to claim 18,
wherein the lens-side mount is rotated to be attached to the camera-side mount,
wherein the camera-side contact group further includes a lens detection contact, and
wherein the lens detection contact is disposed at a head in a rotation direction in the case where the lens-side mount is attached to the camera-side mount.

21. The camera according to claim 20,
wherein the camera-side contact group is disposed in an order of the lens detection contact as the head and other contacts including the plurality of power contacts, ground contacts, and communication contacts with respect to the rotation direction in the case where the lens-side mount is attached to the camera-side mount.

22. A camera to which an interchangeable lens is attachably and detachably attached, the camera comprising:
a camera-side mount to which a lens-side mount provided in the interchangeable lens is attachably and detachably attached;
a camera-side contact group that is composed of a plurality of contacts including a plurality of power contacts, ground contacts, and communication contacts, and is provided in the camera-side mount;
a power supply unit that supplies pieces of lens-drive power respectively having different voltages to the plurality of power contacts of the camera-side contact group, in which a voltage of lens-drive power having the lowest voltage among a plurality of pieces of lens-drive power is higher than a voltage of system power of the interchangeable lens; and
a camera control unit,
wherein the power supply unit has a supplying capacity enhancement function for enhancing supplying capacity of lens-drive power having the highest voltage among the plurality of pieces of lens-drive power, and
wherein in the case where the interchangeable lens is attached, the camera control unit communicates with the lens control unit provided in the interchangeable lens to acquire the lens information on the interchangeable lens attached to the camera from the lens control unit, discriminates whether lens-drive power with enhanced supplying capacity is necessary based on the acquired lens information, and operates the supplying capacity enhancement function of the power supply unit in a case where it is discriminated that the lens-drive power with enhanced supplying capacity is necessary.

23. The camera according to claim 22,
wherein the supplying capacity enhancement function is a function of increasing a voltage of the lens-drive power having the highest voltage among the plurality of pieces of lens-drive power or a function of increasing a current amount of the lens-drive power having the highest voltage among the plurality of pieces of lens-drive power.

24. A power supply method that supplies lens-drive power and system power to an interchangeable lens in a lens-interchangeable camera system comprising a camera and the interchangeable lens to be attachably and detachably attached to the camera, the power supply method of a camera system comprising:
a step of connecting a plurality of power contacts provided in a camera-side mount of the camera and a plurality of power contacts provided in a lens-side mount of the interchangeable lens;
a step of supplying a plurality of pieces of lens-drive power having different voltages from the camera to the interchangeable lens through a plurality of power contacts;
a step of generating system power using lens-drive power having the lowest voltage among the plurality of pieces of lens-drive power to be supplied from the camera;
a step of acquiring lens information on the interchangeable lens attached to the camera; and
a step of discriminating lens-drive power required for the interchangeable lens attached to the camera based on the acquired lens information to supply only the lens-drive power required for the interchangeable lens from the camera.

25. A power supply method that supplies lens-drive power and system power to an interchangeable lens in a lens-interchangeable camera system comprising a camera and the interchangeable lens to be attachably and detachably attached to the camera, the power supply method of a camera system comprising:
a step of connecting a plurality of power contacts provided in a camera-side mount of the camera and a plurality of power contacts provided in a lens-side mount of the interchangeable lens;
a step of supplying a plurality of pieces of lens-drive power having different voltages from the camera to the interchangeable lens through a plurality of power contacts;
a step of generating system power using lens-drive power having the lowest voltage among the plurality of pieces of lens-drive power to be supplied from the camera;
a step of acquiring lens information on the interchangeable lens attached to the camera;
a step of discriminating whether lens-drive power with enhanced supplying capacity is necessary based on the acquired lens information; and
a step of enhancing the supplying capacity of lens-drive power having the highest voltage among the plurality of pieces of lens-drive power in a case where it is discriminated that the lens-drive power with enhanced supplying capacity is necessary.

* * * * *